(12) United States Patent
Fujino

(10) Patent No.: US 8,588,179 B2
(45) Date of Patent: Nov. 19, 2013

(54) COMMUNICATION SERVICE HANDOVER SYSTEM, COMMUNICATION DEVICE AND COMMUNICATION SERVICE HANDOVER METHOD

(75) Inventor: Shozo Fujino, Tokyo (JP)

(73) Assignee: NEC Corporation, Tokyo (JP)

( * ) Notice: Subject to any disclaimer, the term of this patent is extended or adjusted under 35 U.S.C. 154(b) by 294 days.

(21) Appl. No.: 12/922,792

(22) PCT Filed: Apr. 8, 2009

(86) PCT No.: PCT/JP2009/057197
§ 371 (c)(1),
(2), (4) Date: Sep. 15, 2010

(87) PCT Pub. No.: WO2009/125790
PCT Pub. Date: Oct. 15, 2009

(65) Prior Publication Data
US 2011/0019647 A1    Jan. 27, 2011

(30) Foreign Application Priority Data
Apr. 11, 2008  (JP) ................................. 2008-103217

(51) Int. Cl.
*H04W 4/00*      (2009.01)
(52) U.S. Cl.
USPC ........................................................ 370/331
(58) Field of Classification Search
USPC ......... 370/203, 204–215, 229–240, 310–337, 370/338–350, 395.1, 395.3, 395.4, 395.41, 370/395.42, 395.5, 395.52, 395.53, 370/412–421, 431–529
See application file for complete search history.

(56) References Cited

U.S. PATENT DOCUMENTS

| | | | | |
|---|---|---|---|---|
| 7,603,408 | B1 * | 10/2009 | McGinnis et al. | 709/203 |
| 2007/0104166 | A1 * | 5/2007 | Rahman et al. | 370/338 |
| 2007/0165572 | A1 * | 7/2007 | Lenzarini | 370/331 |
| 2007/0233876 | A1 * | 10/2007 | Thompson | 709/227 |
| 2011/0096664 | A1 * | 4/2011 | Petry et al. | 370/231 |

FOREIGN PATENT DOCUMENTS

| | | |
|---|---|---|
| JP | 2005-210378 A | 8/2005 |
| JP | 2005-535241 A | 11/2005 |
| JP | 2007-104163 A | 4/2007 |
| WO | 2006/088035 A1 | 8/2006 |

OTHER PUBLICATIONS

Narito Fuyutsume et al., "Implementation and Evaluation of the Proxy Server for Host Mobility Support", T. IEE Japan, Nov. 1, 2000, pp. 1702-1710, vol. 120-c, No. 11.
Takao Nakanishi et al., "Session Continuation Platform for Service Mobility on Ubiquitous Network", NTT R & D, Mar. 10, 2003, pp. 223-230, vol. 52, No. 3.

* cited by examiner

*Primary Examiner* — Jung-Jen Liu
(74) *Attorney, Agent, or Firm* — Sughrue Mion, PLLC

(57) ABSTRACT

In a communication service handover system, a communication service used by a user by a first communication device is continuously used by a second communication device, and said first communication device and said second communication device are distinct from each other. The communication service handover system includes a socket update request block configured on said first communication device to request said second communication device to update a socket; a first socket control block configured on said first communication device to close a socket; and a second socket control block configured on said second communication device to apply socket information received from said first communication device.

20 Claims, 15 Drawing Sheets

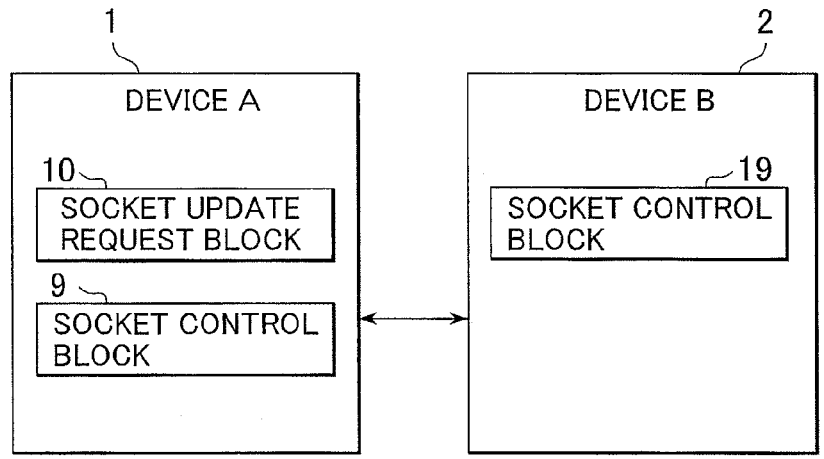
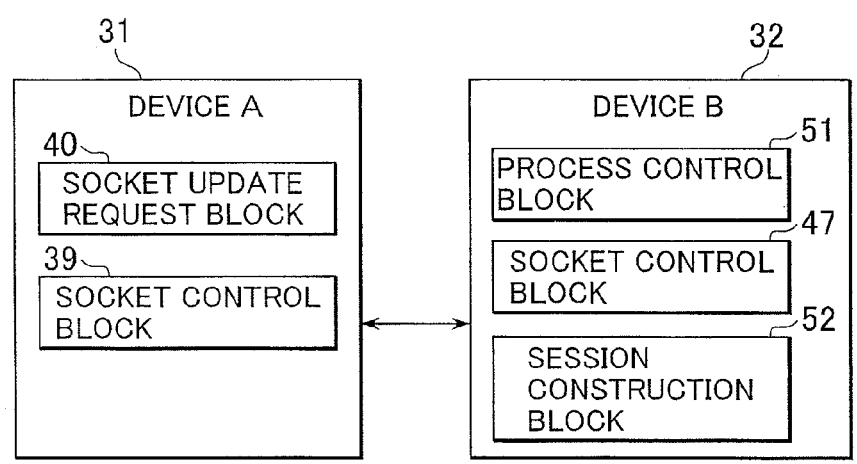
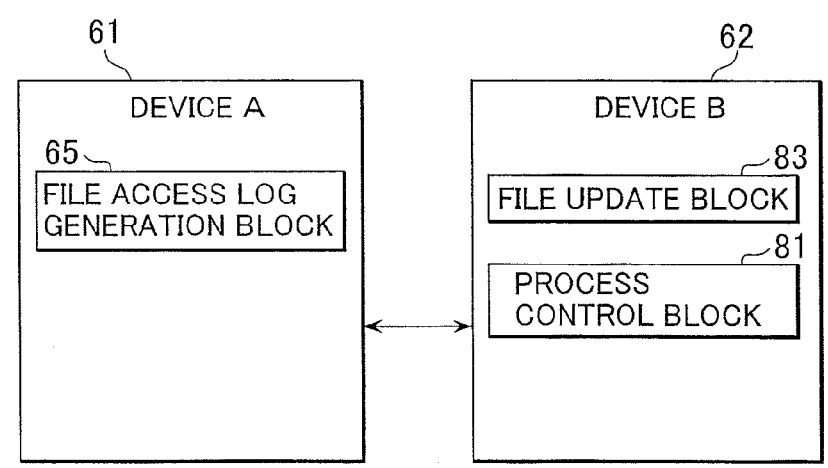

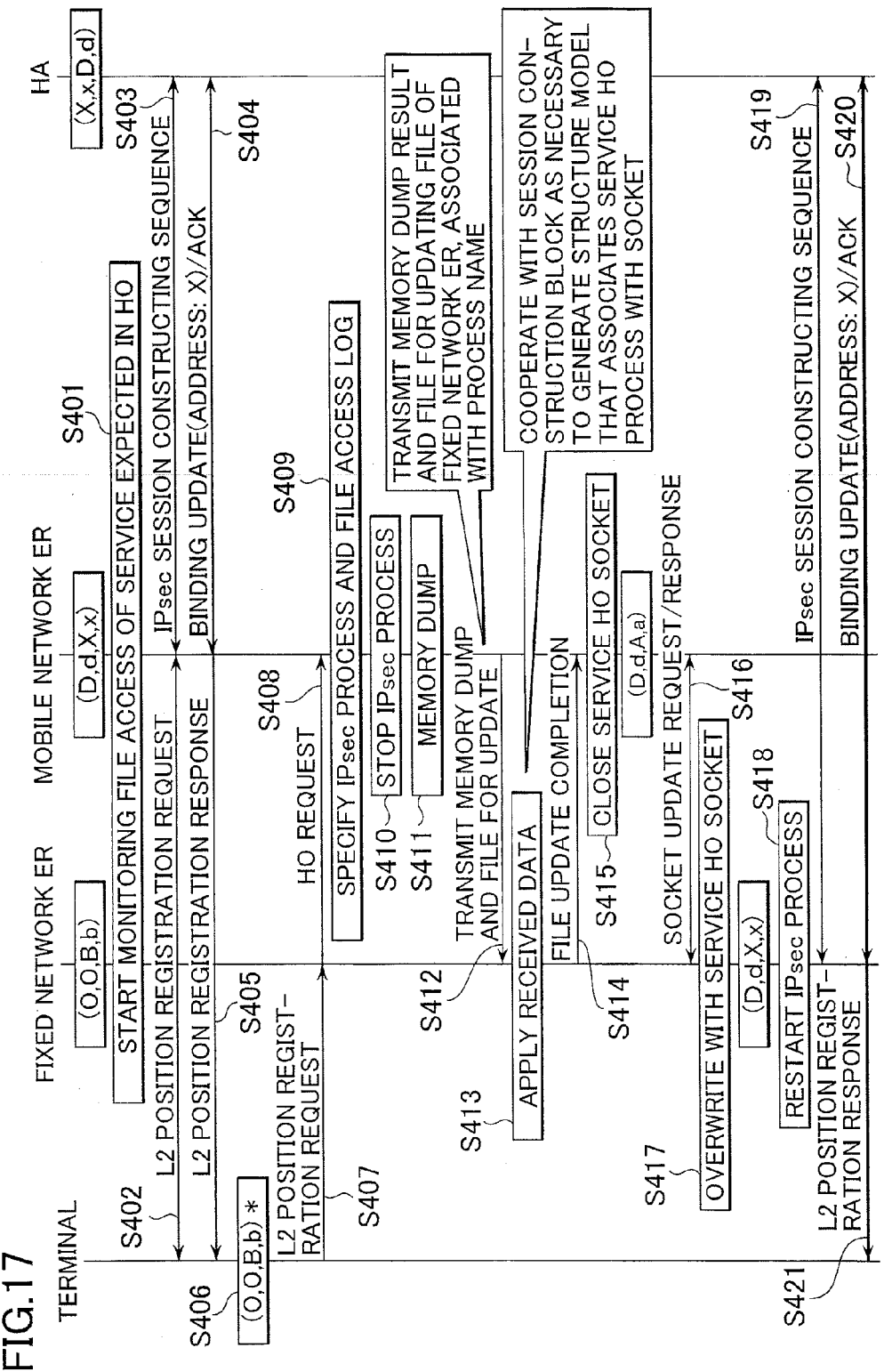

COMMUNICATION SERVICE HANDOVER SYSTEM, COMMUNICATION DEVICE AND COMMUNICATION SERVICE HANDOVER METHOD

CROSS REFERENCE TO RELATED APPLICATIONS

This application is a National Stage of International Application No. PCT/JP2009/057197 filed on Apr. 8, 2009, which claims priority from Japanese Patent Application No. 2008-103217, filed on Apr. 11, 2008, the contents of all of which are incorporated herein by reference in their entirety.

TECHNICAL FIELD

The present invention relates to a communication service handover system and, in particular, relates to a communication service handover system in which a communication service used by a user in a predetermined device is used continuously in other devices.

BACKGROUND ART

As a method for communication service handover in which a communication service used by a user in a certain device is used continuously in other devices, there are following methods. First of all, there is a method in which SIP (Session Initiation Protocol) module is mounted in a client and a server so as to apply a sequence such as "3rd party call" and "Call Transfer". Other methods include a method to mount corresponding middleware in a client and a server by independently defining a state description for each service application, a method to introduce a virtual socket between a service application and a BSD socket, and a method to mount a platform such as JAVA (registered trademark) and VMware (registered trademark) so as to transfer to each application.

If a sequence such as "3rd Party Call" and "Call Transfer" is applied as a method for communication service handover, interaction is required between a SIP module and a service application. If middleware with independently defined state description for each service application is mounted, it is similarly necessary to correspond to each service application in addition to require interaction between the middleware and a service application. Also, in the case of introducing a virtual socket, it is necessary to prepare a new service application in which API used for virtual socket is mounted. If a platform such as JAVA (registered trademark) and VMware (registered trademark) is mounted, it is accompanied with necessity of newly preparing a service application in which "JAVA (registered trademark) API" is mounted and necessity of integrally transferring components ranged from OS (Operating System) to applications. Moreover, many methods for the communication service handover require additional mounting on a server side to realize communication service handover.

As a related technique, Japanese Patent Publication JP2005-210378A discloses an application software transition method in multi-computer architecture.

This related technique, which corresponds to one of methods for the communication service handover between clients, is characterized by having a session manager and a network controller in the outside of a device. This related technique, which discloses communication service handover between clients, requires that a device is linked to a session manager and a network controller which are provided in the outside of the device.

Japanese Patent Publication JP-2005-535241A also discloses a session manager.

This related technique, which corresponds to one of methods for communication service handover between servers, is characterized by being based on a cluster technique. This related technique, which discloses communication service handover between servers, is after all a switching technique applied to servers. It is also premised on the presence of cluster software, wherein it is prerequisite to be retrieved from a state in the middle of a session by mounting a checkpoint function for clustering.

CITATION LIST

Patent Literature

Patent Literature 1: Japanese Patent Publication JP-2005-210378A
Patent Literature 2: Japanese Patent Publication JP-2005-535241A

DISCLOSURE OF INVENTION

An object of the present invention is to provide a communication service handover system in which a communication service used by a user by a certain device can be continuously used by another device, wherein the system is realized without adding functions on a network side, makes an existing service application usable by both client and server and further enables service transition for arbitrary applications.

The communication service handover system according to the present invention includes at least socket update request means and socket control means.

Alternatively, the communication service handover system according to the present invention includes at least socket control means, socket update request means, process control means and session construction means.

Alternatively, the communication service handover system according to the present invention includes at least file access log generation means, file update means and process control means.

For example, the communication service handover system according to the present invention includes service providing means, move management server means, file access log generation means, HO (handover) process specification means, process control means, socket control means, data transmission means, socket update request means, move management CL means, session construction means, file generation means, communication means, process control means, file update means, socket control means, move management CL means and communication means.

The service providing means provides user with service. The move management server means manages a move of a client on a server side. The file access log generation means is mounted in a device A (or first communication device) and generates a log of a file access by a process. The HO (handover) process specification means determines a process to be handed over by user specification. The process control means acts to stop a process and the like. The socket control means acts to close a socket and the like. The data transmission means transmits necessary data to a device B (or second communication device). The socket update request means requests the device B to update a socket. The move management CL means transmits, on a client side, a position registration message to the move management server means. The session construction means constructs a session to use a service with the service providing means. The file generation means generates a file which is handled by a process. The communication means communicates with an outside of the devices. The process control means is mounted in the device B and controls a process. The file update means applies a file received from the device A thereto. The socket control means applies socket information received from the device A thereto. The move management CL means transmits, on the client side, a position registration message to the move management server means. The communication means communicates with the outside of the devices.

The service handover system according to the present invention also includes, as one of additional functions, memory dump means, memory update means and session construction means.

The memory dump means is mounted in the device A and dumps a memory used by a process at a certain timing. The memory update means is mounted in the device B and applies a memory dump received from the device A thereto. The session construction means constructs a session to use a service with the service providing means.

The communication service handover system according to the present invention also includes, as one of additional functions, process start request means, log match determination means, file transmission request means and session construction means.

The process start request means is mounted in the device A and causes the device B to start a process. The log match determination means is mounted in the device B and determines whether a file access log received from the device A matches a log of a sequence process executed by itself. The file transmission request means requests, in response to the log match, the device A to transmit a file. The session construction means constructs a session to use a service with the service providing means.

The communication service handover system according to the present invention also includes, as one of additional functions, message dump means, message match determination means, process start request means, dummy socket generation means, transfer means, dummy socket application means, routing update means, and session construction means.

The message dump means is mounted in the device A and dumps, for each "Destination Port Number", a message received in session construction. The message match determination means captures a session constructing message sent to the device B and determines whether it matches to some extent (or is the same as or similar to) a message dump result obtained from session construction by itself. The process start request means causes the device B to start a process. The dummy socket generation means captures an address used for the device B from a socket pool of itself and generates a dummy socket. The transfer means transfers a packet exchanged between the device B and the service providing means. The dummy socket application means is mounted in the device B and applies a dummy socket received from the device A thereto. The routing update means switches routing between I/F (interface) on a LAN (local area network) side and I/F on a WAN (wide area network) side. The session construction means constructs a session to use a service with the service providing means.

The service providing means holds service contents to provide a service for a user who is connected thereto. The move management means receives, on the server side, a position registration message from a client and carries out a move management.

Explanation will be made for the device A.

(1) The file access log generation means generates a log of a file access by a process.

(2) The HO process specification means determines a process to be handed over by user specification.

(3) The process control means acts to stop a process and the like.

(4) The socket control means acts to close a socket and the like.

(5) The data transmission means transmits necessary data to the device B.

(6) The socket update request means requests the device B to update a socket.

(7) The move management CL means transmits, on the client side, a position registration message to the move management server means.

(8) The session construction means constructs a session to use a service with the service providing means.

(9) The file generation means generates a file which is handled by a process.

(10) The communication means communicates with the outside of the device.

(11) The memory dump means dumps a memory used by a process at a certain timing.

(12) The process start request means causes the device B to start a process.

(13) The message dump means dumps, for each "Destination Port Number", a message received in session construction.

(14) The message match determination means captures a session constructing message sent to the device B and determines whether it matches to some extent (or is the same as or similar to) the message dump result obtained from session construction by itself.

(15) The dummy socket generation means traps an address used for the device B from a socket pool of itself and generates a dummy socket.

(16) The transfer means transfers a packet exchanged between the device B and the service providing means.

Explanation will be made for the device B.

(1) The process control means controls a process.

(2) The file update means applies a file received from the device A thereto.

(3) The socket control means applies socket information received from the device A thereto.

(4) The move management CL means transmits, on the client side, a position registration message to the move management server means.

(5) The communication means communicates with the outside of the device.

(6) The memory update means applies a memory dump received from the device A thereto.

(7) The log match determination means determines whether a file access log received from the device A matches a log of a sequence process executed by itself.

(8) The file transmission request means requests, in response to a log match, the device A to transmit a file.

(9) The session construction means constructs a session to use a service with the service providing means.

(10) The dummy socket application means applies a dummy socket received from the device A thereto.

(11) The routing update means switches routing between I/F on the LAN side and I/F on the WAN side.

Existing service applications are used by both client and server so as to allow service transition for arbitrary application without adding functions on a network side.

BRIEF DESCRIPTION OF DRAWINGS

FIG. 1 is a block diagram showing a first system configuration example of a communication service handover system according to the present invention.

FIG. 2 is a block diagram showing a second system configuration example of the communication service handover system according to the present invention.

FIG. 3 is a block diagram showing a third system configuration example of the communication service handover system according to the present invention.

FIG. 17 is a sequence diagram showing a process in the tenth system configuration example.

DESCRIPTION OF EMBODIMENTS

Figure 4:
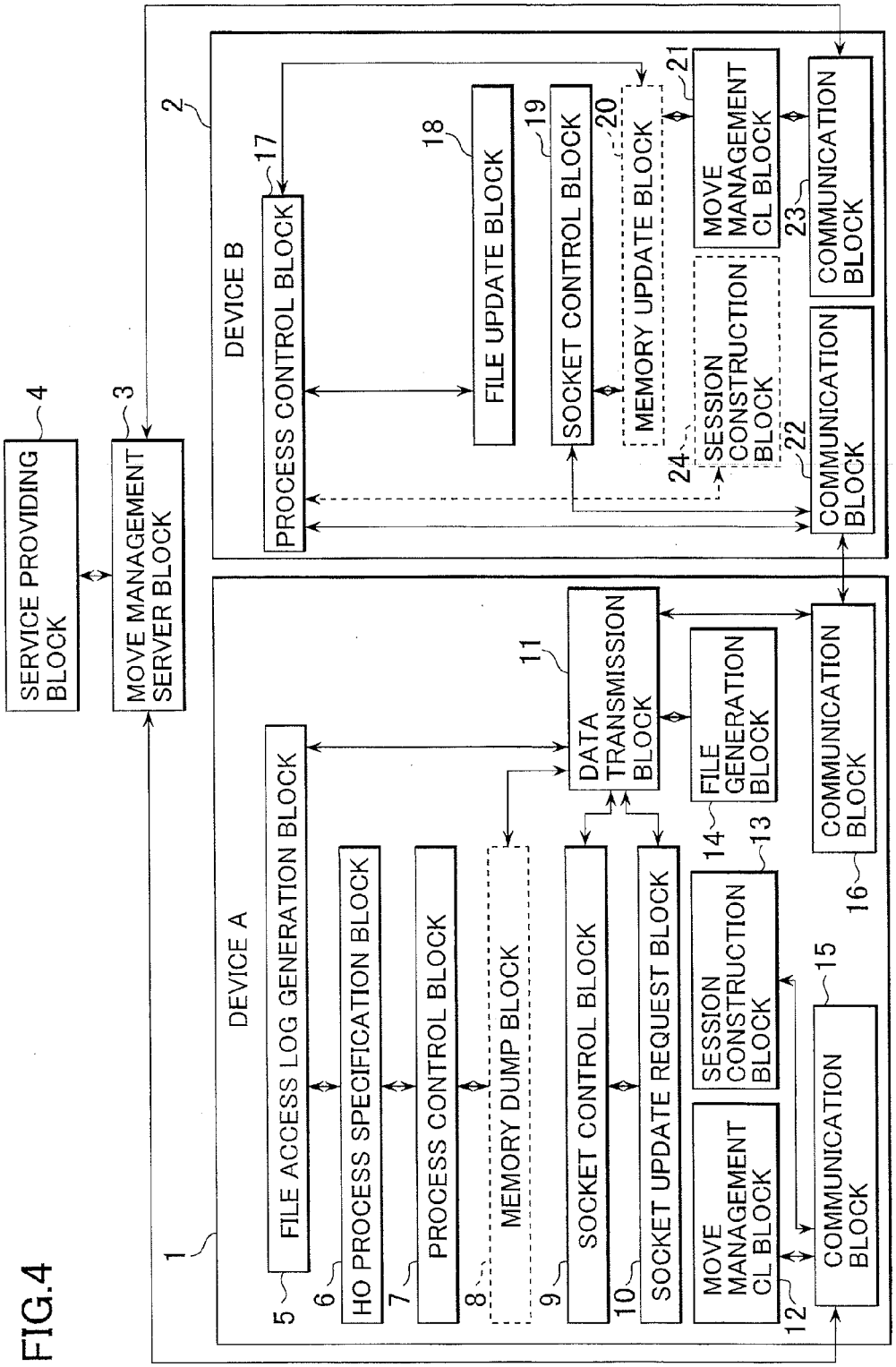
FIG. 4 is a block diagram showing a fourth system configuration example of the communication service handover system according to the present invention.

Explained below referring to an accompanying drawing will be a first exemplary embodiment of the present invention.

First System Configuration Example

FIG. 1 shows a first system configuration example of a communication service handover system according to the present invention.

Referring to FIG. 1, the communication service handover system according to the present invention includes a device A (or first communication device) 1 and a device B (or second communication device) 2.

Each of the device A1 and the device B2 is a terminal and an intra-network apparatus.

The device A1 is provided with a socket control block 9 and a socket update request block 10.

The device B2 is provided with a socket control block 19.

The socket control block 9 provided in the device A1 closes a socket (or address X) which corresponds to an executed process and is used for user data communication and control data communication for exclusive use of the communication service handover, followed by being switched to use another socket (or address A).

Next, the socket update request block 10 provided in the device A1 transmits the device B2 a message requesting to start using a socket for exclusive use of the communication service handover, and the socket control block 19 provided in the device B2 is switched to start using a socket (or address X) used for user data communication and control data communication for exclusive use of the communication service handover.

Second System Configuration Example

FIG. 2 shows a second system configuration example of the communication service handover system according to the present invention.

Referring to FIG. 2, the communication service handover system according to the present invention includes a device A (or first communication device) 31 and a device B (or second communication device) 32.

Each of the device A31 and the device A32 is a terminal and an intra-network apparatus.

The device A31 is provided with a socket control block 39 and a socket update request block 40.

The device B32 is provided with a process control block 47, a socket control block 51 and a session construction block 52.

The socket control block 39 provided in the device A31 closes a socket (or address X) which corresponds to an executed process and is used for user data communication and control data communication for exclusive use of the communication service handover, followed by being switched to use another socket (or address A).

Next, the socket update request block 40 provided in the device A31 transmits the device B32 a message requesting to start using a socket for exclusive use of the communication service handover, and the socket control block 51 provided in the device B32 is switched to start using the socket (or address X) used for user data communication and control data communication for exclusive use of the communication service handover.

The process control block 47 provided in the device B32 also generates a structure by which a process and a socket for exclusive use of the communication service handover are made to correspond to each other. Therefore, the process control block 47 causes the session construction function 52 to act on a session construction sequence which is carried out to use the process by using another socket (or address B), and cerates a structure model, whereby a period of time spent for generating a structure is shortened in comparison with generating it from zero.

Third System Configuration Example

FIG. 3 shows a third system configuration example of the communication service handover system according to the present invention.

Referring to FIG. 3, the communication service handover system according to the present invention includes a device A (or first communication device) 61 and a device B (or second communication device) 62.

Each of the device A61 and the device B62 is a terminal and an intra-network apparatus.

The device A61 is provided with a file access log generation block 65.

The device B62 is provided with a process control block 81 and a file update block 83.

The file access log generation block 65 provided in the device A61 starts monitoring a file access in a form of including, at least, a process which is expected to be in continuous use even if terminals are switched, and also stores it as a log.

Here, if a user specifies a process desired to be handed over to switch terminals, the device A61 specifies, based on this specification, an access file related to the process by referring to a log generated by the file access log generation block 65 and a group of files held therein.

The device A61 makes an access file related to the process to correspond to a process name to transmit to the device B62.

The process control block 81 provided in the device B62 causes the file update block 83 to act on updating or generating the access file received from the device A61 in association with the received process name.

Explained below will be a concrete exemplary embodiment for each of the above system configuration examples.

Fourth System Configuration Example

FIG. 4 shows a fourth system configuration example of the communication service handover system according to the present invention.

Referring to FIG. 4, the communication service handover system according to the present invention includes the device A (or first communication device) 1, the device B (or second communication device) 2, a move management server block 3, and a service providing block 4.

Each of the device A1 and the device B1 is a terminal and an intra-network apparatus.

The device A1 is provided with a file access log generation block 5, an HO (handover) process specification block 6, a process control block 7, a memory dump block 8, the socket control block 9, the socket update request block 10, a data transmission block 11, a move management CL block 12, a session construction block 13, a file generation block 14, a communication block 15, and a communication block 16.

The device B2 is provided with a process control block 17, a file update block 18, the socket control block 19, a memory update block 20, a move management CL block 21, a communication block 22, and a communication block 23. The device B2 is further provided with, in some cases, a session construction block 24.

Fifth System Configuration Example

Figure 5:
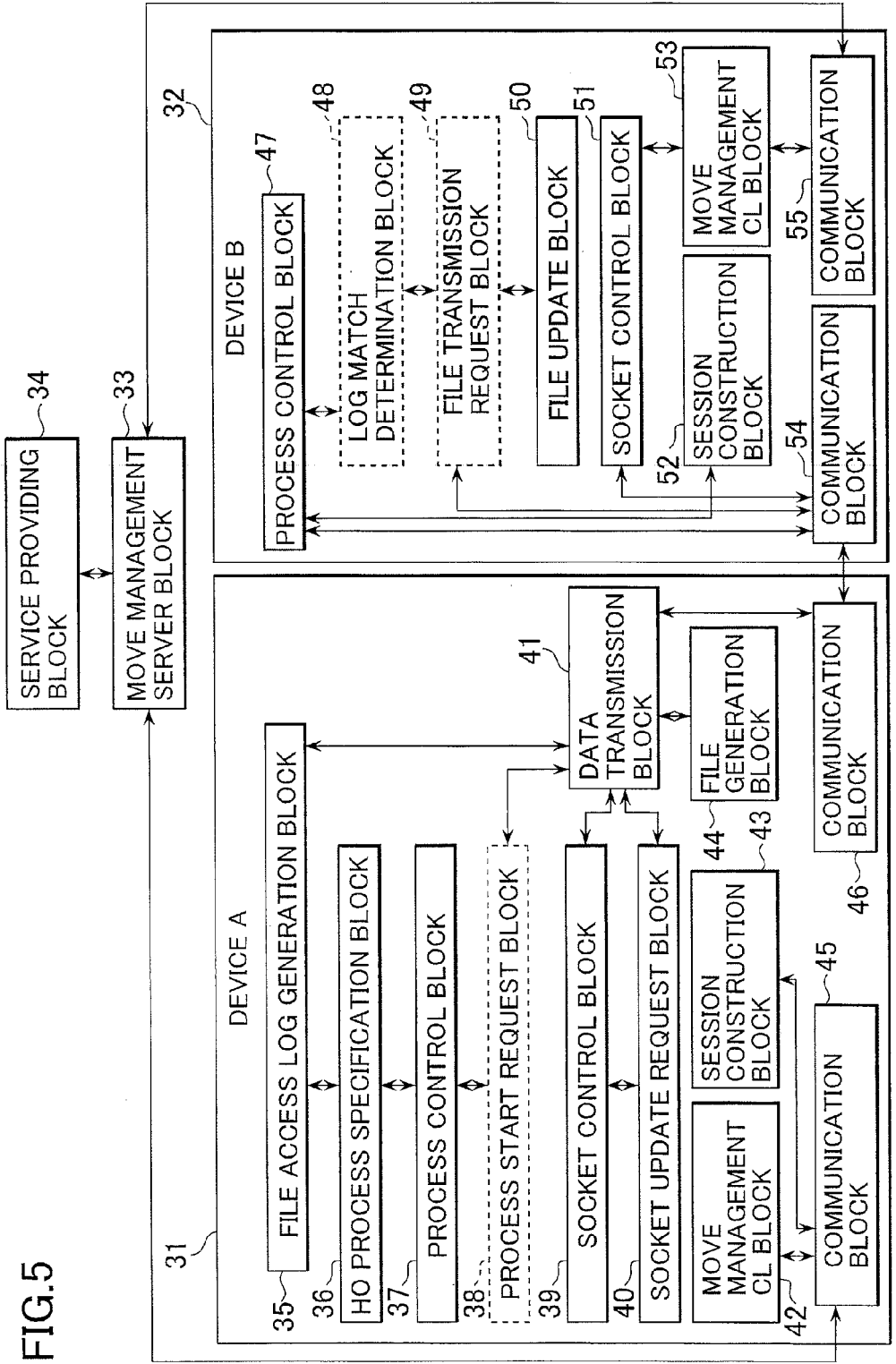
FIG. 5 is a block diagram showing a fifth system configuration example of the communication service handover system according to the present invention.

FIG. 5 shows a fifth system configuration example of the communication service handover system according to the present invention.

Referring to FIG. 5, the communication service handover system according to the present invention is provided with the device A (or first communication device) 31, the device B (or second communication device) 32, a move management server block 33, and a service providing block 34.

Each of the device A31 and the device B32 is a terminal and intra-network apparatus.

The device A31 is provided with a file access log generation block 35, an HO process specification block 36, a process control block 37, a process start request block 38, the socket control block 39, the socket update request block 40, a data transmission block 41, a move management CL block 42, a session construction block 43, a file generation block 44, a communication block 45, and a communication block 46.

The device 32 is provided with the process control block 47, a log match determination block 48, a file transmission request block 49, a file update block 50, the socket control block 51, the session construction block 52, a move management CL block 53, a communication block 54, and a communication block 55.

Sixth System Configuration Example

Figure 6:
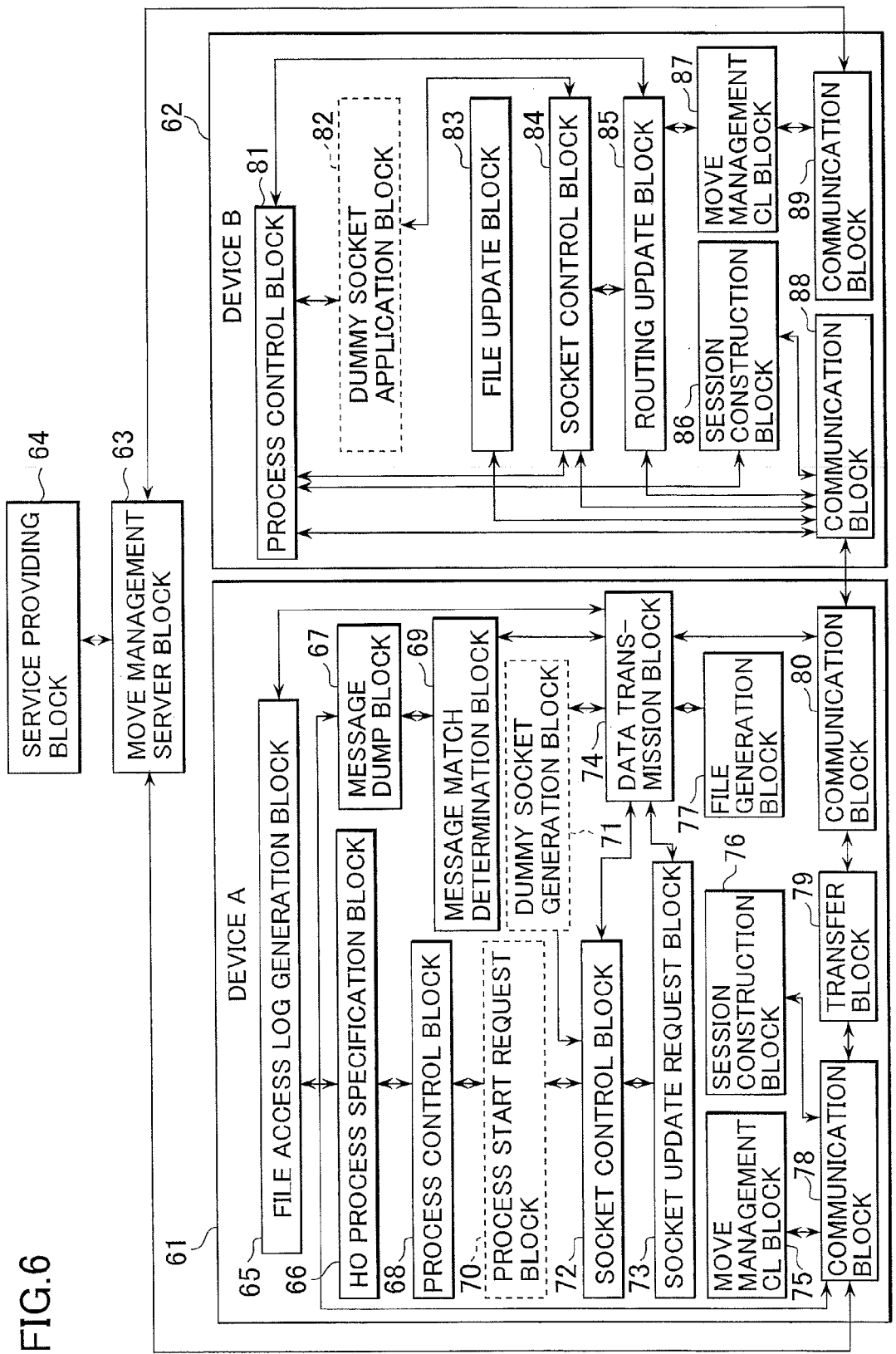
FIG. 6 is a block diagram showing a sixth system configuration example of the communication service handover system according to the present invention.

FIG. 6 shows a sixth system configuration example of the communication service handover system according to the present invention.

Referring to FIG. 6, the communication service handover system according to the present invention includes the device A (or first communication device) 61, the device B (or second communication device) 62, a move management server block 63, and a service providing block 64.

Each of the device A61 and the device B62 is a terminal and intra-network apparatus.

The device A61 is provided with the file access log generation block 65, an HO process specification block 66, a message dump block 67, a process control block 68, a message match determination block 69, a process start request block 70, a dummy socket generation block 71, a socket control block 72, a socket update request block 73, a data transmission block 74, a move management CL block 75, a session construction block 76, a file generation block 77, a communication block 78, a transfer block 79, and a communication block 80.

The device B62 is provided with the process control block 81, a dummy socket application block 82, the file update block 83, a socket control block 84, a routing update block 85, a session construction block 86, a move management CL block 87, a communication block 88 and a communication block 89.

Shown below are common parts shared in each of the system configuration examples of the communication service handover system according to the present invention.

First of all, each of the blocks in the devices A (including the device A1, the device A31 and the device A61) will be explained.

The file access log generation block 5 is the same as the file access log generation block 35 and the file access log generation block 65.

The HO process specification block 6 is the same as the HO process specification block 36 and the HO process specification block 66.

The process control block 7 is the same as the process control block 37 and the process control block 68.

The socket control block 9 is the same as the socket control block 39 and the socket control block 72.

The socket update request block 10 is the same as the socket update request block 40 and the socket update request block 73.

The data transmission block 11 is the same as the data transmission block 41 and the data transmission block 74.

The move management CL block 12 is the same as the move management CL block 42 and the move management CL block 75.

The session construction block 13 is the same as the session construction block 43 and the session construction block 76.

The file generation block 14 is the same as the file generation block 44 and the file generation block 77.

The communication block 15 is the same as the communication block 45 and the communication block 78.

The communication block 16 is the same as the communication block 46 and the communication block 80.

Explained next will be each of the blocks in the devices B (including the device B2, the device B32 and the device B62).

The process control block 17 is the same as the process control block 47 and the process control block 81.

The file update block 18 is the same as the file update block 50 and the file update block 83.

The socket control block 19 is the same as the socket control block 51 and the socket control block 84.

The move management CL block 21 is the same as the move management CL block 53 and the move management CL block 87.

The communication block 22 is the same as the communication block 54 and the communication block 88.

The communication block 23 is the same as the communication block 55 and the communication block 89.

The session construction block 24 is the same as the session construction block 52 and the session construction block 86.

Further explained will be each of the move management server blocks and the service providing blocks in the outside of the devices A and the devices B.

The move management server block 3 is the same as the move management server block 33 and the move management server block 63.

The service providing block 4 is the same as the service providing block 34 and the service providing block 64.

In other words, the memory dump block 8 and the memory update block 20 provided in the fourth system configuration example are unique blocks belonging to the fourth system configuration example. The process start request block 38, the log match determination block 48 and the file transmission request block 49 provided in the fifth system configuration example are also unique blocks belonging to the fifth system configuration example. In addition, the message dump block 67, the message match determination block 69, and the process start request block 70, the dummy socket generation block 71, the transfer block 79, the dummy socket application block 82, and the routing update block 85 provided in the sixth system configuration example are unique blocks belonging to the sixth system configuration example.

Each of the system configuration examples in the communication service handover system according to the present invention can be combined to each other. That is, the communication service handover system according to the present invention can be realized by including, along with the common parts, all the unique parts belonging to the respective system configuration examples.

Note that, as an example of the respective blocks provided in the devices A and the devices B, there is considered a processing device such as a CPU (Central Processing Unit) and a microprocessor, or a semiconductor IC (Integrated Circuit) having similar functions, or a program which causes a computer to execute a process corresponding to each function, or other devices. Note that a program which causes a computer to execute a process corresponding to each function can be stored in a storage medium. However, these examples are not limited in practice.

Also considered as an example of each of the communication blocks provided in the devices A and the devices B are a network adaptor such as an NIC (Network Interface Card), a communication device such as an antenna, a communication port such as a connector, and other devices. In this case, examples of a communication method used by each of the communication blocks include an internet, a LAN (Local Area Network), a wireless LAN, a mobile phone network, WiMAX, 3G (third-generation mobile phone), an exclusive line, IrDA (Infrared Data Association), Bluetooth (registered trademark), a serial communication line, data bus and the like. However, these examples are not limited in practice.

Further considered as an example of the move management server blocks and the service providing blocks in the outside of the devices A and the devices B are a physical server device, a VM (Virtual Machine) environment with a server function, and the like. If the service providing block is a server, the move management server function may be a relay apparatus. However, these examples are not limited in practice.

Although a physical apparatus is assumed as an example of the devices A and the devices B here, it is not limited to a physical apparatus in practice and a VM environment mounted in a computer may also be employed.

Operation of Fourth System Configuration Example

Figure 7:
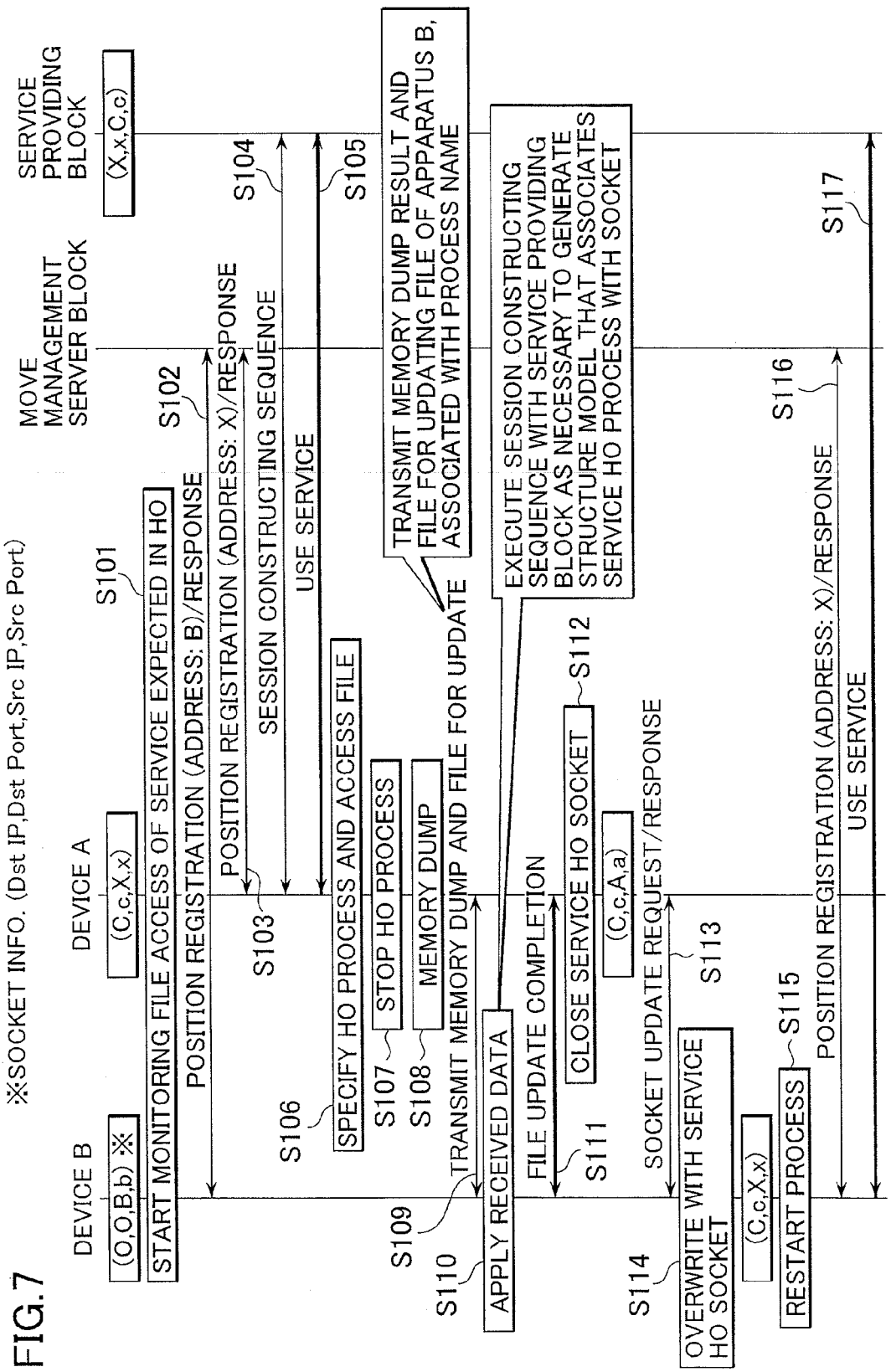
FIG. 7 is a sequence diagram showing a process in the fourth system configuration example.

Referring to FIG. 7, a process in the fourth system configuration example will be explained.

Each of the device A1 and the device B2, which may be an intra-network apparatus such as a router, is a terminal in a representative example of the present system.

The device A1 is a terminal carried by a user, having "IP address: A" and "Port number: a" that are assigned by a service provider and the like for use in user data communication. The device A1 further has "IP address: X" and "Port number: x" for exclusive use of the communication service handover on the assumption that terminals are switched.

The device B2 also has "IP address: B" and "Port number: b" assigned by a service provider and the like.

The service providing function 4 has "IP address: C" and "Port number: c".

Note that X is mounted as an address with priority in the device A1 because of the assumption that terminals are switched constantly. These address use situations are shown in an uppermost area of processes carried out by the respective devices as shown in FIG. 7.

In FIG. 7, socket information showing an address use situation is indicated in a form of Dst IP, Dst Port, Src IP and Src Port. The "Dst (Destination)" and "Src (Source)" are information to specify a communication direction. The "Dst" here indicates a transmission destination (or destination). The "Src" indicates a transmission source (or source).

(1) Step S101

Now, it is assumed that a user tries to use a communication service by using the device A1. The file access log generation block 5 provided in the device A1 starts monitoring a file access in a form of including, at least, a process which is expected to be in continuous use even if terminals are switched, and also stores it as a log. Note that, after the operation is handed over to the device B2 in a later process, to further switch back to the device A1 again, a file access log generation function is to be mounted internally in the device B2 as well. In thus including the switch-back in the system, all the blocks obtained by adding up the blocks mounted in the device A1 and the device B1 are to be mounted in each of the devices.

(2) Step S102

The move management CL block 21 provided in the device B2 transmits the move management server block 3 a position registration message regarding the address B, and receives a response from the move management server block 3.

(3) Step S103

The move management CL block 12 provided in the device A1 transmits the move management server block 3 a position registration message regarding the address X, and receives a response from the move management server block 3.

(4) Step S104

The session construction block 13 provided in the device A1 carries out a session constructing sequence to use a communication service with the service providing block 4.

(5) Step S105

When the session constructing sequence is completed, the session construction block 13 provided in the device A1 uses a communication service.

(6) Step S106

Here, if a user wishes to switch terminals, the HO process specification block 6 provided in the device A1 specifies a process desired to be handed over. This specification may be realized manually or automatically. The device A1 specifies, based on this specification, an access file related to an HO process by referring to a log generated by the file access log generation block 5 and a group of files held by the file generation block 14.

(7) Step S107

The process control block 7 provided in the device A1 stops the HO process which has been activated.

(8) Step S108

The memory dump block 8 provided in the device A1 dumps a memory used by the HO process at this timing.

(9) Step S109

The data transmission block 11 provided in the device A1 transmits the device B2 the memory dump and the access file related to the HO process in association with a process name.

(10) Step S110

The process control block 17 provided in the device B2 causes the file update block 18 to update or generate the memory dump and the access file received from the device A1 in association with the received process name. At this time, the process control block 17 generates a structure by which the HO process and a HO socket are made to correspond to each other, wherein it is also possible to generate, for enhancing efficiency, as needed, a structure model by causing the session construction block 24 to act on a session constructing sequence which is carried out to use the communication service with the service providing block 4. Note that the process control block 17 uses, in session construction at this time, the address B and the like.

(11) Step S111

The process control block 17 provided in the device B2 transmits a completion notification to the device A1 when the file update is completed by the file update block 18.

(12) Step S112

The socket control block 9 provided in the device A1 closes a socket (or address X) used for user data communication and control data communication for exclusive use of the communication service handover. As a result, the device A1 is switched to use the address A.

(13) Step S113

The socket update request block 10 provided in the device A1 transmits the device B2 a message requesting to start using a socket for exclusive use of the communication service handover. Note that the socket update request block 10 provided in the device A1 can also transmit contents similar to this request message at the same timing as sending data in step S109.

(14) Step S114

The socket control block 19 provided in the device B2 applies the socket for exclusive use of the communication service handover, which was received from the device A1, thereto. As a result, the device B2 is switched to use the address X and specifies C for a communication party address.

(15) Step S115

The memory update block 20 provided in the device B2 applies the memory dump, received from the device A1, thereto at this timing in association with the received process name, and restarts the HO process by the process control block 17.

(16) Step S116

The move management CL block 21 provided in the device B2 transmits the move management server block 3 a position registration message regarding the address X, and receives a response from the move management server block 3.

(17) Step S117

The move management CL block 21 provided in the device B2 determines the communication service with the service providing block 4 is completely handed over by a routing change made in the move management server block 3, and uses the communication service.

Operation of Fifth System Configuration Example

Figure 8:
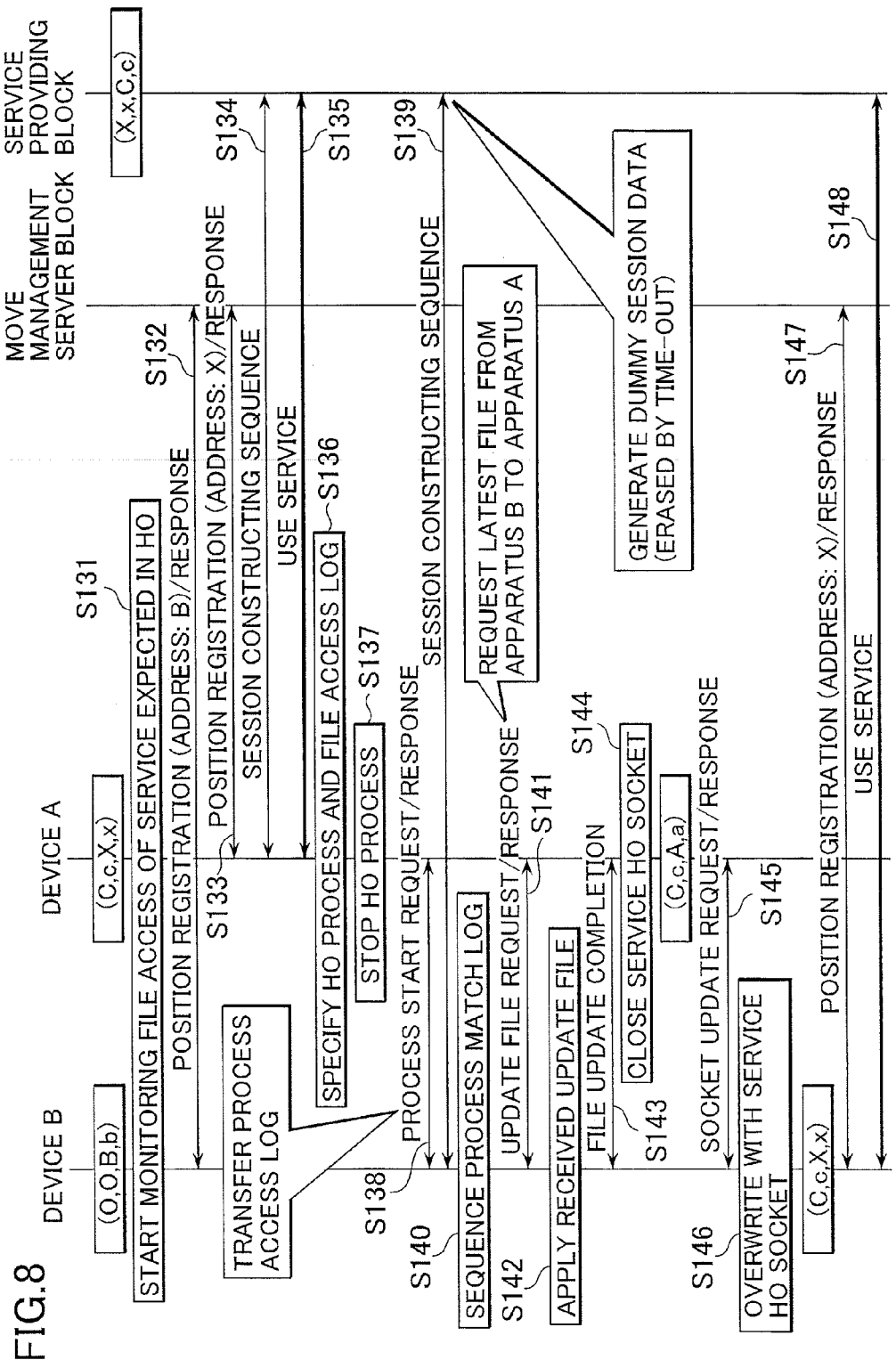
FIG. 8 is a sequence diagram showing a process in the fifth system configuration example.

Referring to FIG. 8, a process in the fifth system configuration example will be explained.

Each of the device A31 and the device B32, which may be an intra-network apparatus such as a router, is a terminal in a representative example of the present system.

The device A31 is a terminal carried by a user, having "IP address: A" and "Port number: a" assigned by a service provider and the like for use in user data communication. The device A31 further has "IP address: X" and "Port number: x" for exclusive use of the communication service handover on the assumption that terminals are switched.

The device B32 also has "IP address: B" and "Port number: b" assigned by a service provider and the like.

The service providing block 34 has "IP address: C" and "Port number: c".

Note that X is mounted as an address with priority in the device A31 because of the assumption that terminals are switched constantly. These address use situations are shown in an uppermost area of processes carried out by the respective devices as shown in FIG. 8.

(1) Step S131

Now, it is assumed that a user tries to use a communication service by using the device A31. The file access log generation function 35 provided in the device A31 starts monitoring a file access in a form of including, at least, a process which is expected to be in continuous use even if terminals are switched, and also stores it as a log. Note that, although the operation is handed over to the terminal B32 in a later process, to further switch back to the device A31 again, a file access log generation block is to be mounted in the device B32 as well. In thus including the switch-back in the system, all the blocks obtained by adding up the blocks mounted in the device A31 and the device B32 are to be mounted in each of the devices.

(2) Step S132

The move management CL block 53 provided in the device B32 transmits the move management server block 33 a position registration message regarding the address B, and receives a response from the move management server block 33.

(3) Step S133

The move management CL block 42 provided in the device A31 transmits the move management server block 33 a position registration message regarding the address X, and receives a response from the move management server block 33.

(4) Step S134

The session construction block 43 provided in the device A31 carries out a session constructing sequence to use a communication service with the service providing block 34.

(5) Step S135

When the session constructing sequence is completed, the session construction block 43 provided in the device A31 uses a communication service.

(6) Step S136

Here, if a user wishes to switch terminals, the HO process specification block 36 provided in the device A31 specifies a process desired to be handed over. This specification may be realized manually or automatically. The device A31 specifies, based on this specification, a file access log related to an HO process by referring to a log generated by the file access log generation block 35.

(7) Step S137

The process control block 37 provided in the device A31 stops the HO process which has been activated.

(8) Step S138

The process start request block 38 provided in the device A31 transmits the device B32 a process start request message including a specified file access log, and causes the HO process to start.

(9) Step S139

The process control block 47 provided in the device B32 causes the HO process to start by receiving the process start request message from the device A31, and causes the session construction block 52 to act on a session constructing sequence which is carried out to use a communication service with the service providing block 34. Note that the session constructing sequence, which is carried out with the service providing block 34, may also be realized by a method to pass through the device A31 as shown in the sixth system configuration example to be described later. Also note that session data generated by the service providing block 34 as a result of the sequence is not applicable in actual service usage and may be deleted in timeout.

(10) Step S140

The log match determination block 48 provided in the device B32 confirms whether a file access log received from the device A31 matches a log of a sequence process executed by itself.

(11) Step S141

In the case of a log match, the file transmission request block 49 provided in the device B32 requests the device A31 to transmit the latest HO process access file which needs to be updated, and receives a response from the device A31.

(12) Step S142

The data transmission block 41 provided in the device A31 transmits the device B32 an access file related to the HO process by referring to a log generated by the file access log generation block 35 and a group of files held by the file generation block 44.

(13) Step S143

The file update block 50 provided in the device B32 updates or generates the access file received from the device A31 in association with the received process name, and when it is completed, transmits a completion notification to the device A31.

(14) Step S144

The socket control block 39 provided in the device A31 closes a socket (or address X) used for user data communication and control data communication for exclusive use of the communication service handover. As a result, the device A31 is switched to use the address A.

(15) Step S145

The socket update request block 40 provided in the device A31 transmits the device B32 a message requesting to start using a socket for exclusive use of the communication service handover. Note that the socket update request block 40 provided in the device A31 can also transmit contents similar to this request message at the same timing as sending data in steps S138 and S141.

(16) Step S146

The socket control block 51 provided in the device B32 applies a socket for exclusive use of the communication service handover, which was received from the device A31, thereto. As a result, the device B32 is switched to use the address X and specifies C for a communication party address.

(17) Step S147

The move management CL block 53 provided in the device B32 transmits the move management server block 33 a position registration message regarding the address X, and receives a response from the move management server block 33.

(18) Step S148

The move management CL block 53 provided in the device B32 determines a communication service with the service providing block 34 is completely handed over by a routing change made in the move management server block 33, and uses the communication service.

Operation of Sixth System Configuration Example

Figure 9:
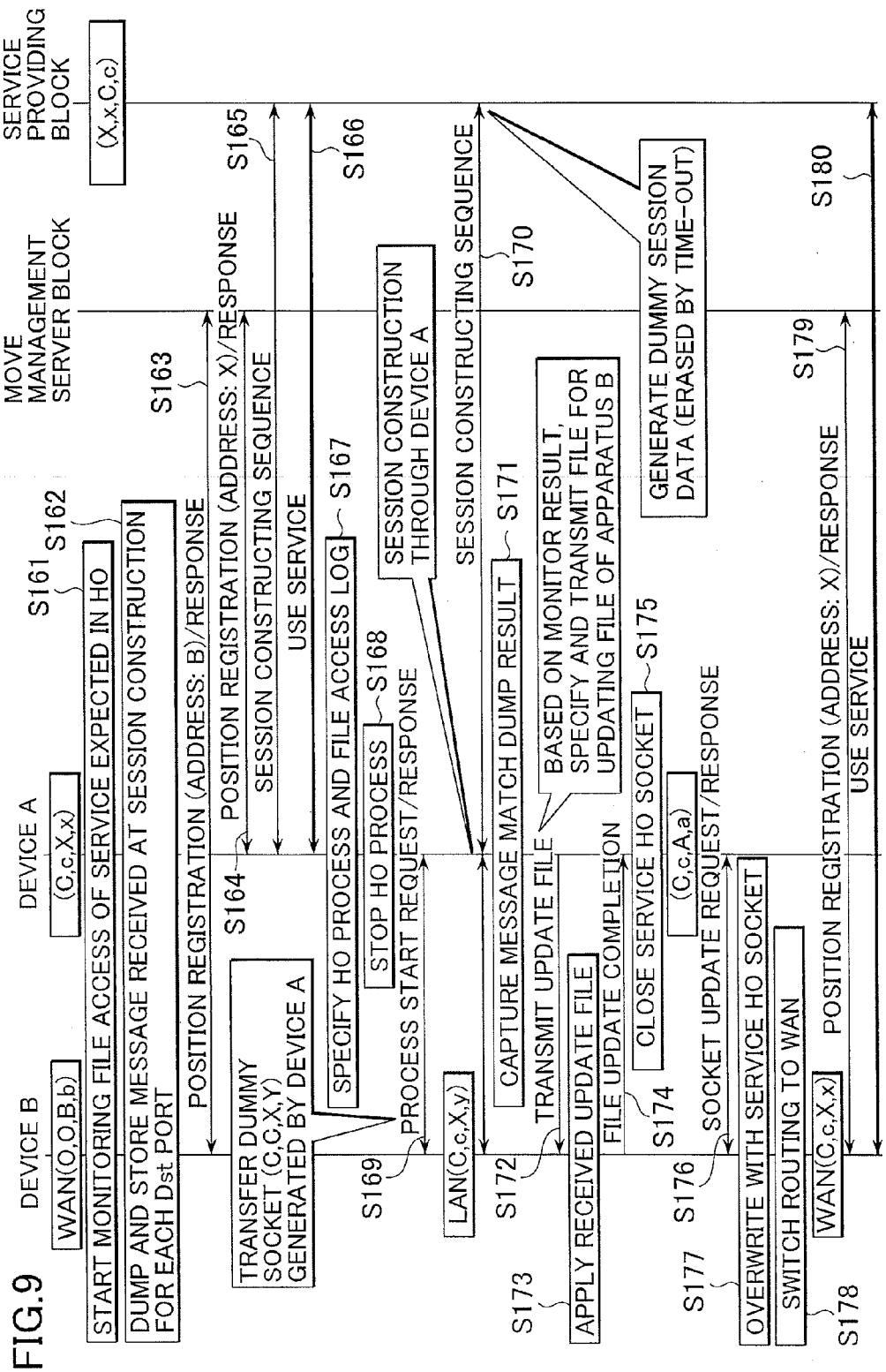
FIG. 9 is a sequence diagram showing a process in the sixth system configuration example.

Referring to FIG. 9, a process in the sixth system configuration example will be explained.

Each of the device A61 and the device B62, which may be an intra-network apparatus such as a router, is a terminal in a representative example of the present system.

The device A61 is a terminal carried by a user, having "IP address: A" and "Port number: a" assigned by a service provider and the like for use in user data communication. The device A61 further has "IP address: X" and "Port number: x" for exclusive use of the communication service handover on the assumption that terminals are switched.

The device B62 also has "IP address: B" and "Port number: b" assigned by a service provider and the like.

The service providing block 64 has "IP address: C" and "Port number: c".

Note that X is mounted as an address with priority in the device A61 because of the assumption that terminals are switched constantly. These address use situations are shown in an uppermost area of processes carried out by the respective devices as shown in FIG. 9.

(1) Step S161

Now, it is assumed that a user tries to use a communication service by using the device A61. The file access log generation block 65 provided in the device A61 starts monitoring a file access in a form of including, at least, a process which is expected to be in continuous use even if terminals are switched, and also stores it as a log. Note that, although the operation is handed over to the device B62 in a later process, to further switch back to the device A61 again, a file access log generation block is to be mounted in the device B62 as well. As described above, upon including the switch-back in the system, all the blocks obtained by adding up the blocks mounted in the device A61 and the device B62 are to be mounted in each of the devices.

(2) Step S162

The message dump block 67 provided in the device A61 dumps, for each "Destination Port Number", a message received by the communication block 78 in constructing a session with the service providing block 64.

(3) Step S163

The move management CL block 87 provided in the device B62 transmits the move management server block 63 a position registration message regarding the address B, and receives a response from the move management server block 63.

(4) Step S164

The move management CL block 75 provided in the device A61 transmits the move management server block 63 a position registration message regarding the address X, and receives a response from the move management server block 63.

(5) Step S165

The session construction block 76 provided in the device A61 carries out a session constructing sequence to use a communication service with the service providing block 64.

(6) Step S166

When the session constructing sequence is completed, the session construction block 76 provided in the device A61 uses a communication service.

(7) Step S167

Here, in a circumstance where a user wishes to switch terminals, the HO process specification block 66 provided in the device A61 specifies a process desired to be handed over. This specification may be realized manually or automatically. The device A61 specifies, based on this specification, a file access log related to the HO process by referring to a log generated by the file access log generation block 65.

(8) Step S168

The process control block 68 provided in the device A61 stops the HO process which has been activated.

(9) Step S169

The socket control block 72 provided in the device A61 causes the dummy socket generation block 71 to act on trapping an address used for the device B62 from a socket pool of itself or other appropriate address pool, whereby generating a dummy socket (having "IP address: X" and "Port number: y" in this case). The process start request block 70 provided in the device A61 transmits the device B62 a process start request message including the dummy socket, and causes the HO process to start. Note that, at this time, the communication block 80 provided in the device A61 sets that a packet of a specified type, which was received from the device B62, is transferred to the communication block 78 via the transfer block 79.

(10) Step S170

The process control block 81 provided in the device B62 receives the process start request message from the device A61, and causes, via the socket control block 84, the dummy socket application block 82 to act on applying the dummy socket, which was received from the device A61, thereto in association with the communication block 88. As a result, the device B62 is switched to use the addresses X and y and specifies C for a communication party address.

(11) Step S171

The process control block 81 further causes the HO process to start, and causes the session construction block 86 to act on a session constructing sequence, which is carried out to use a communication service with the service providing block 64, in a form of passing through the device A61. Note that, as a result of the sequence, session data generated by the service providing function 64 is not applicable in actual service usage and may be deleted in timeout.

(12) Step S172

The message match determination block 69 provided in the device A61 captures a session constructing message sent to the device B62, and confirms whether it matches to some extent (or is the same as or similar to) a message dump result obtained from session construction by itself.

(13) Step S173

If the captured session constructing message and the message dump result are confirmed to match to some extent, the data transmission block 74 provided in the device A61 transmits the device B62 an access file related to the HO process by referring to a log generated by the file access log generation block 65 and a group of files held by the file generation block 77.

(14) Step S174

The file update block 83 provided in the device B62 updates or generates the access file received from the device A61 in association with the received process name, and when it is completed, transmits a completion notification to the device A61.

(15) Step S175

The socket control block 72 provided in the device A61 closes a socket (or addresses X and x) used for user data communication and control data communication for exclusive use of the communication service handover. As a result, the device A61 is switched to use the address A.

(16) Step S176

The socket update request block 73 provided in the device A61 transmits the device B62 a message requesting to start using a socket for exclusive use of the communication service handover. Note that the socket update request block 73 can also transmit contents similar to this request message at the same timings as sending data in steps S169 and S172.

(17) Step S177

The socket control block 84 provided in the device B62 applies the socket for exclusive use of the communication service handover, which was received from the device A61, thereto.

(18) Step S178

The socket control block 84 provided in the device B62 further causes the routing update block 85 to act on changing a socket for exclusive use of the communication service handover in association with the communication block 89 (i.e. switching between I/F on the LAN side and I/F on the WAN side). As a result, the device B62 is switched to use an addresses X and x and specifies C for a communication party address.

(19) Step S179

The move management CL block 87 provided in the device B62 transmits the move management server block 63 a position registration message regarding the addresses X and x, and receives a response from the move management server block 63.

(20) Step S180

The move management CL block 87 provided in the device B62 determines a communication service with the service providing block 64 is handed over completely by a routing change made in the move management server block 63, and uses the communication service.

Explained below will be a second exemplary embodiment of the present invention.

In the present exemplary embodiment, explanation will be made for a case where each of the device A and the device B is an intra-network apparatus such as a router. For example, if each of the device A and the device B is an edge router and employs a form of taking over and mounting a client block which is usually held by a subordinate terminal (i.e. proxy type), the present patent can be applied to a communication service handover among the device A, the device B and a service providing block placed on a network side.

The socket update request block provided in the device A, which transmits the device B a message requesting to start using a socket for exclusive use of the communication service handover, can also transmit contents similar to this request message at the same timing as sending some messages transmitted from the device A to the device B in an earlier stage. In such a case, a process for a socket update request and a response message is deleted.

Seventh System Configuration Example

A seventh system configuration example is based on the fourth system configuration example and there is shown a case where the communication service handover is carried out between terminals.

Figure 10:
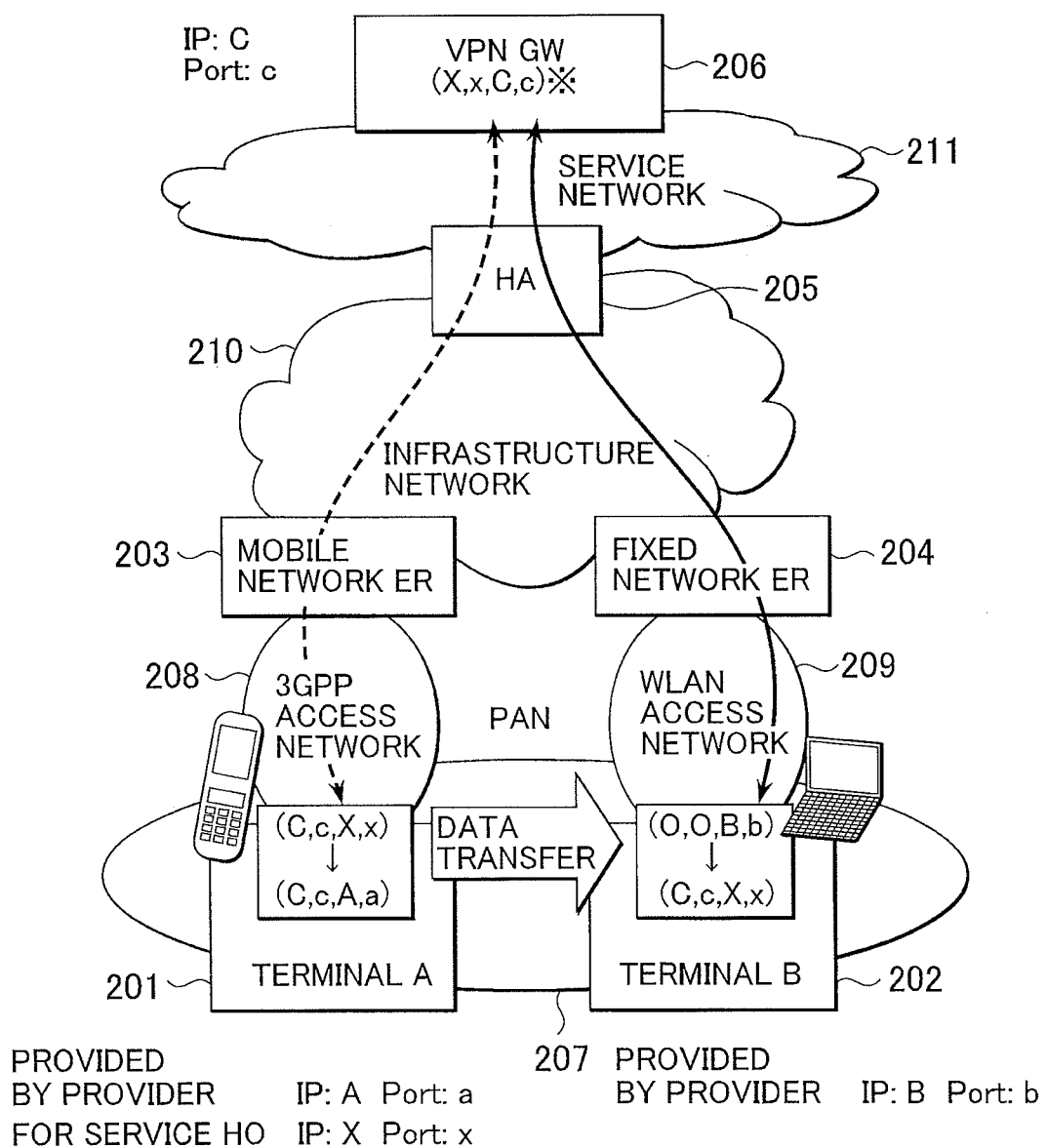
FIG. 10 is a block diagram showing a seventh system configuration example of the communication service handover system according to the present invention.

FIG. 10 shows the seventh system configuration example of the communication service handover system according to the present invention.

Referring to FIG. 10, the communication service handover system according to the present invention includes a terminal A (or first communication device) 201, a terminal B (or second communication device) 202, a mobile network ER (Edge Router) 203, a fixed network ER 204, a HA (Home Agent) 205, and a VPN gateway (VPN GW (Virtual Private Network Gateway)) 206.

Here, the terminal A201 corresponds to the terminal A1 in the fourth system configuration example. The terminal B202 corresponds to the terminal B2 in the fourth system configuration example. The mobile network ER 203 relays communication between the terminal A201 and the HA205. The fixed network ER 204 relays communication between the device B202 and the HA 205. The HA 205 corresponds to the move management server function 3 in the fourth system configuration example. The VPN gateway (VPN GW) 206 corresponds to the service providing block 4 in the fourth system configuration example.

At this time, the terminal A201 is connected to the terminal B202 via a PAN (Personal Area Network) 207. The mobile network ER 203 is connected to the terminal A201 via a 3GPP access network 208, and connected to the HA 205 via an infrastructure network 210. The fixed network ER 204 is connected to the device B202 via a WLAN access network 209, and connected to the HA 205 via the infrastructure network 210. The VPN GW 206 is connected to the HA 205 via a service network 211.

Operation of Seventh System Configuration Example

Figure 11:
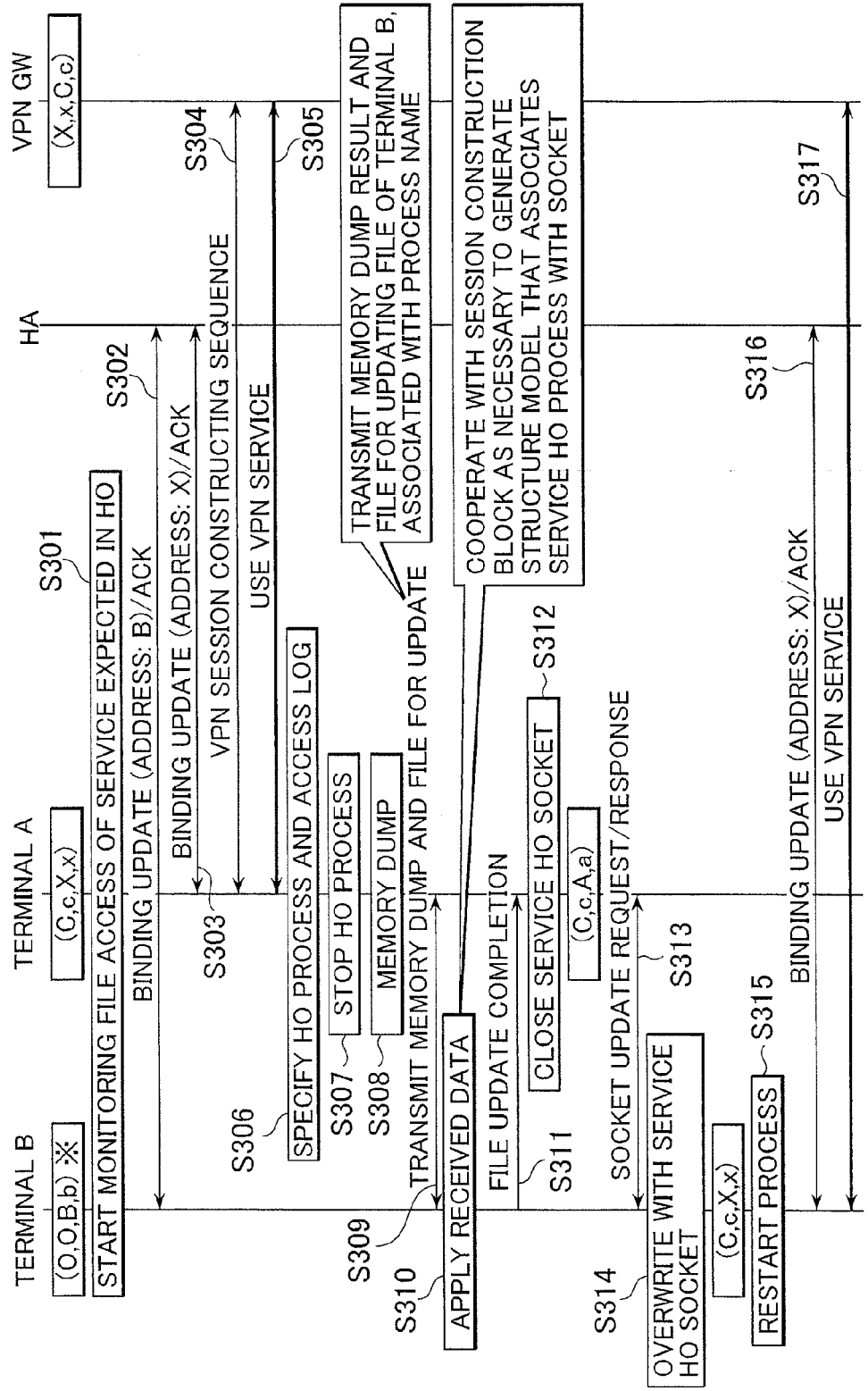
FIG. 11 is a sequence diagram showing a process in the seventh system configuration example.

Referring to FIG. 11, a process in the seventh system configuration example will be explained.

The terminal A201 is a terminal carried by a user and connected to the infrastructure network 210 via the 3GPP access network 208. The terminal A201 also has an "IP address: A" and a "Port number: a" assigned by a service provider and the like for use in user data communication. The terminal A201 further has "IP address: X" and "Port number: x" for exclusive use of the communication service handover on the assumption that terminals are switched.

The terminal B202 is connected to the infrastructure network 210 via the WLAN access network 209. The terminal B202 also has an "IP address: B" and a "Port number: b" assigned by a service provider and the like. The terminal A201 and the terminal B202 are connected to each other by a local network such as the PAN 207.

The VPN gateway (VPN GW) 206 is arranged in the service network 211, having an "IP address: C" and a "Port number: c". The VPN GW 206 also terminates VPN tunneling such as SSL (Secure Socket Layer) and IPsec (Security Architecture for Internet Protocol). Note that X is mounted as an address with priority in the terminal A201 because of the assumption that terminals are switched constantly. These address use situations are shown in the uppermost area of processes carried out by the respective devices as shown in FIG. 11.

(1) Step S301

Now, it is assumed that a user tries to use a VPN service by using the terminal A201. The terminal A201 starts monitoring a file access by a VPN process, and also stores it as a log. Here, the terminal A201 and the terminal B202 operate as a client of "MobileIPv6". The HA 205 operates as a server.

(2) Step S302

The terminal B202 transmits the HA 205 a "Binding Update" message regarding the address B, and receives a response from the HA 205.

(3) Step S303

The terminal A201 transmits the HA 205 a "Binding Update" message regarding the address X, and receives a response from the HA 205.

(4) Step S304

The terminal A201 carries out a session constructing sequence to use a VPN service with the VPN gateway (VPN GW) 206.

(5) Step S305

When the session constructing sequence is completed, the terminal A201 uses a VPN service.

(6) Step S306

Here, in a circumstance where a user wishes to switch terminals, the terminal A201 specifies a process desired to be handed over. This specification may be realized manually or automatically. The terminal A201 specifies, based on this specification, an access file related to a HO process by referring to a file access log and a group of files.

(7) Step S307

The terminal A201 stops the HO process which has been activated.

(8) Step S308

The terminal A201 dumps a memory used by the HO process at this timing.

(9) Step S309

The terminal A201 transmits the terminal B202 the memory dump and the access file related to the HO process in association with a name of the VPN process.

(10) Step S310

The terminal B202 updates or generates the memory dump and the access file, which were received from the terminal A202, in association with the received process name. At this time, the terminal B202 generates a structure by which the HO process and a HO socket are made to correspond to each other, wherein it is also possible to generate, for enhancing efficiency, as needed, a structure model by carrying out a session constructing sequence to use a VPN service with the VPN gateway (VPN GW) 206. Note that the terminal B202 uses the address B or other addresses in session construction at this time.

(11) Step S311

When the file update is completed, the terminal B202 transmits a completion notification to the terminal A201.

(12) Step S312

The terminal A201 closes a socket (or address X) used for user data communication and control data communication for exclusive use of the communication service handover. As a result, the terminal A201 is switched to use the address A.

(13) Step S313

The terminal A201 transmits the terminal B202 a message requesting to start using a socket for exclusive use of the communication service handover. Note that the terminal A201 can also transmit contents similar to this request message at the same timing as sending data in step S309.

(14) Step S314

The terminal B202 applies the socket for exclusive use of the communication service handover, which was received from the terminal A201, thereto. As a result, the terminal B202 is switched to use the address X and specifies C for a communication party address.

(15) Step S315

The terminal B202 applies the memory dump, which was received from the terminal A201, thereto at this timing in association with the received process name, and restarts the HO process.

(16) Step S316

The terminal B202 transmits the HA 205 a "Binding Update" message regarding the address X, and receives a response from the HA 205.

(17) Step S317

The terminal B202 determines a VPN service with the VPN gateway (VPN GW) 206 is handed over completely by a routing change made in the HA 205, and uses the VPN service.

Eighth Configuration Example

An eighth system configuration example is based on the fifth system configuration example and there is shown a case where the communication service handover is carried out between terminals.

Figure 12:
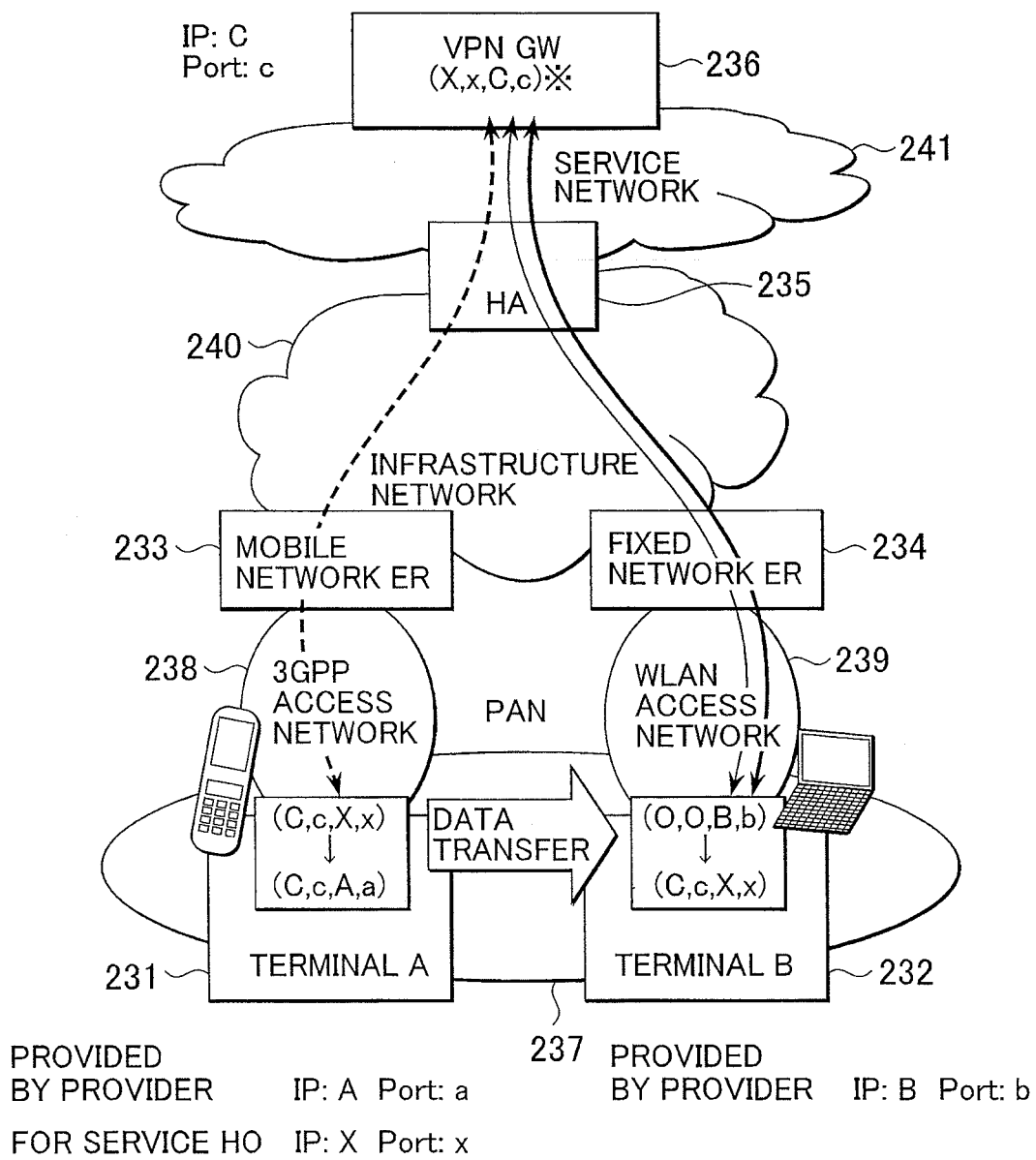
FIG. 12 is a block diagram showing an eighth system configuration example of the communication service handover system according to the present invention.

FIG. 12 shows the eighth system configuration example of the communication service handover system according to the present invention.

Referring to FIG. 12, the communication service handover system according to the present invention includes a terminal A (or first communication device) 231, a terminal B (or second communication device) 232, a mobile network ER 233, a fixed network ER 234, a HA 235 and a VPN gateway (VPN GW) 236.

Here, the terminal A231 corresponds to the device A31 in the fifth system configuration example. The terminal B232 corresponds to the device B32 in the fifth system configuration example. The mobile network ER 233 relays communication between the terminal A231 and the HA 235. The fixed network ER 234 relays communication between the terminal B232 and the HA 235. The HA 235 corresponds to the move management server block 33 in the fifth system configuration example. The VPN gateway (VPN GW) 236 corresponds to the service providing block 34 in the fifth system configuration example.

At this time, the terminal A231 is connected to the terminal B232 via a PAN 237. The mobile network ER 233 is connected to the terminal A231 via a 3GPP access network 238, and connected to the HA 235 via an infrastructure network 240. The fixed network ER 234 is connected to the device B232 via a WLAN access network 239, and connected to the HA 235 via the infrastructure network 240. The VPN gateway (VPN GW) 236 is connected to the HA 235 via a service network 241.

Operation of Eight System Configuration Example

Figure 13:
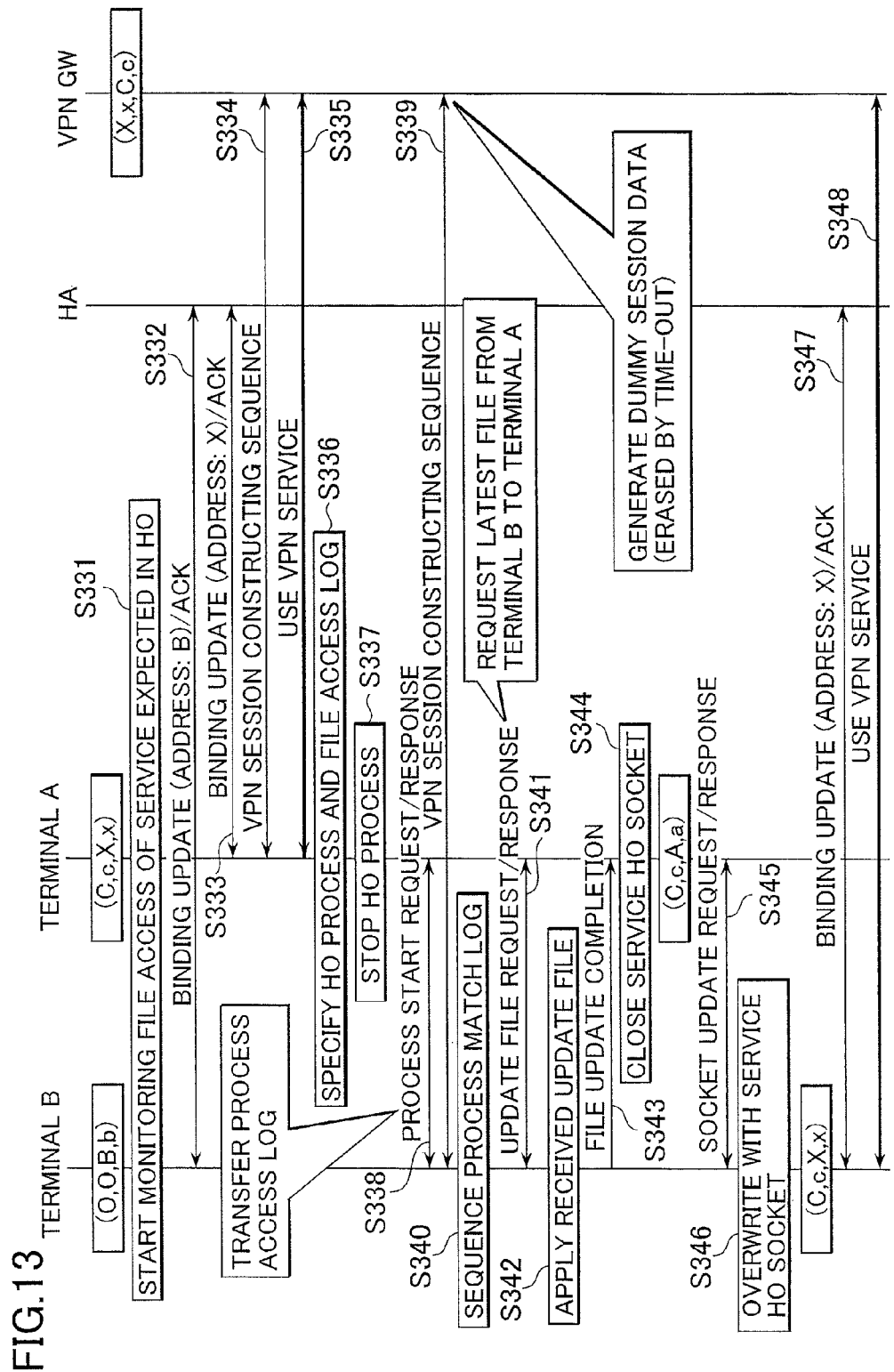
FIG. 13 is a sequence diagram showing a process in the eighth system configuration example.

Referring to FIG. 13, a process in an eighth system configuration example will be explained.

The terminal A231 is a terminal carried by a user and connected to the infrastructure network 240 via the 3GPP access network 238. The terminal A231 also has an "IP address: A" and a "Port number: a" assigned by a service provider and the like for use in user data communication. The terminal A231 further has an "IP address: X" and a "Port number: x" for exclusive use of the communication service handover on the assumption that terminals are switched.

The terminal B232 is connected to the infrastructure network 240 via the WLAN access network 239. It also has an "IP address: B" and a "Port number: b" assigned by a service provider and the like. The terminal A231 and the terminal B232 are connected to each other by a local network such as the PAN 237.

The VPN gateway (VPN GW) 236 is arranged in the service network 241, having an "IP address: C" and a "Port number: c". The VPN gateway (VPN GW) 236 also terminates VPN tunneling such as SSL and IPsec.

Note that X is mounted as an address with priority in the terminal A231 because of the assumption that terminals are switched constantly. These address use situations are shown in an uppermost area of processes carried out by the respective devices as shown in FIG. 13.

(1) Step S331

Now, it is assumed that a user tries to use a VPN service by using the terminal A231. The terminal A231 starts monitoring a file access by a VPN process, and also stores it as a log.

(2) Step S332

The terminal A231 and the terminal B231 operate as a client of MobileIPv6. The HA 235 also operates as a server. The terminal B232 transmits the HA 235 a "Binding Update" message regarding the address B, and receives a response from the HA 235.

(3) Step S333

The terminal A231 transmits the HA 235 a "Binding Update" message regarding the address X, and receives a response from the HA 235.

(4) Step S334

The terminal A231 carries out a session constructing sequence to use a VPN service with the VPN GW 236.

(5) Step S335

When the session constructing sequence is completed, the terminal A231 uses a VPN service.

(6) Step S336

Here, if a user wishes to switch terminals, the terminal A231 specifies a process desired to be handed over. This specification may be realized manually or automatically. The terminal A231 specifies, based on this specification, a file access log related to a HO process by referring to a file access log.

(7) Step S337

The terminal A231 stops the HO process which has been activated.

(8) Step S338

The terminal A231 transmits the terminal B232 a process start request message including a specified file access log, and causes the HO process to start.

(9) Step S339

The terminal B232 causes the HO process to start by receiving the process start request message from the terminal A231, and carries out a session constructing sequence to use a VPN service with the VPN gateway (VPN GW) 236. Note that the session constructing sequence mentioned here, which is carried out directly with the VPN gateway (VPN GW) 236, may also be realized by a method to pass through the terminal A231 as shown in an ninth system configuration example to be described later. In addition, session data which is generated by the VPN gateway (VPN GW) 236 as a result of the sequence is not applicable in actual service usage and may be deleted in timeout.

(10) Step S340

The terminal B232 confirms whether the file access log received from the terminal A231 matches a log of a sequence process executed by itself, and requests the terminal A231 to transmit the latest HO process access file which needs to be updated.

(11) Step S341

The terminal A231 transmits the terminal B232 an access file related to the HO process by referring to a file access log and a group of files.

(12) Step S342

The terminal B232 updates or generates the access file received from the terminal A231 in association with the received process name.

(13) Step S343

When the file update is completed, the terminal B232 transmits a completion notification to the terminal A231.

(14) Step S344

The terminal A231 closes a socket (or address X) used for user data communication and control data communication for exclusive use of the communication service handover. As a result, the terminal A231 is switched to use the address A.

(15) Step S345

The terminal A231 transmits the terminal B232 a message requesting to start using a socket for exclusive use of the communication service handover. Note that the terminal 231 can also transmit contents similar to this request message at the same timing as sending data in steps S348 and S341.

(16) Step S346

The terminal B232 applies the socket for exclusive use of the communication service handover, which was received from the terminal A231, thereto. As a result, the terminal B232 is switched to use the address X and specifies C for a communication party address.

(17) Step S347

The terminal B232 transmits the HA 235 a "Binding Update" message regarding the address X, and receives a response from the HA 235.

(18) Step S348

The terminal B232 determines a VPN service with the VPN gateway (VPN GW) 236 is handed over completely by a routing change made in the HA 235, and uses the VPN service.

Ninth System Configuration Example

A ninth system configuration example is based on the sixth system configuration example and there is shown a case where the communication service handover is carried out between terminals.

Figure 14:
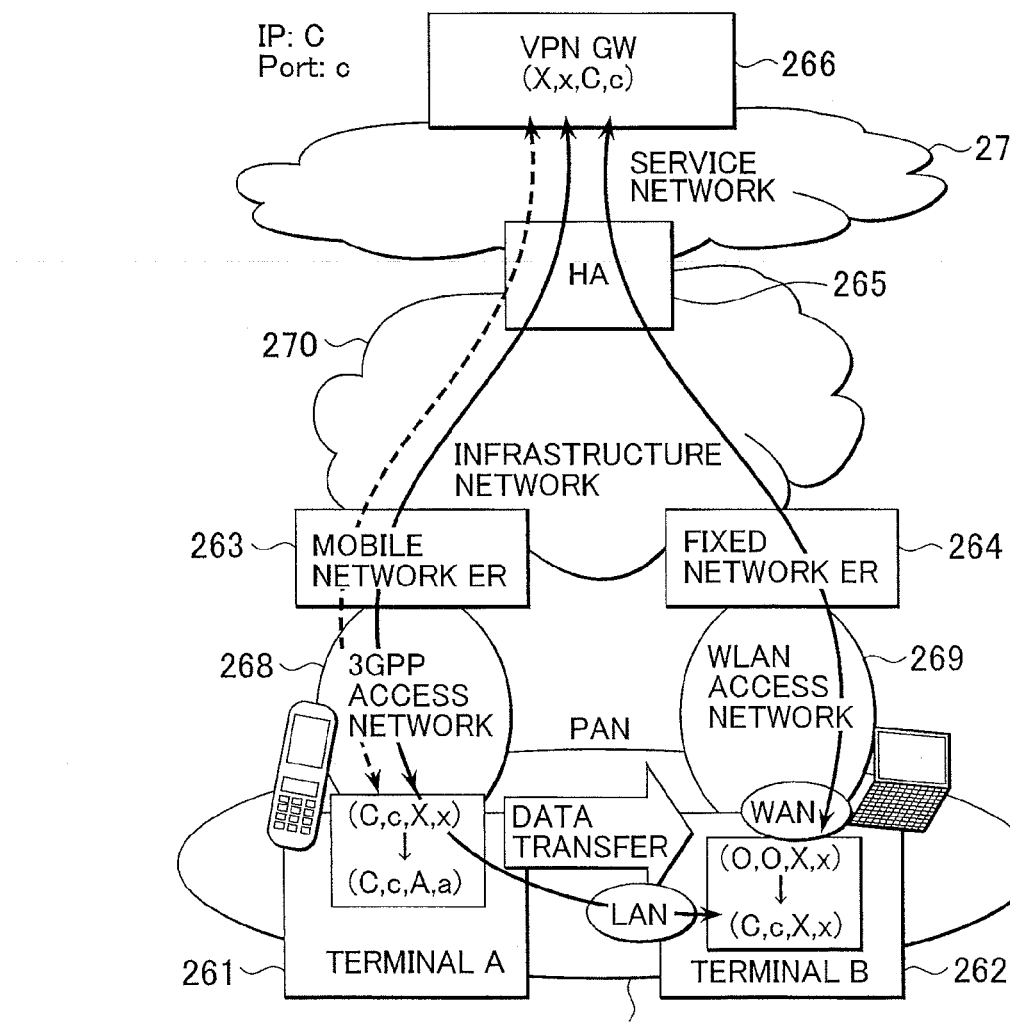
FIG. 14 is a block diagram showing a ninth system configuration example of the communication service handover system according to the present invention.

FIG. 14 shows the ninth system configuration example of the communication service handover system according to the present invention.

Referring to FIG. 14, the communication service handover system according to the present invention includes a terminal A (or first communication device) 261, a terminal B (or second communication device) 262, a mobile network ER 263, a fixed network ER 264, a HA 265, and a VPN gateway (VPN GW) 266.

Here, the terminal A261 corresponds to the device A61 in the sixth system configuration example. The terminal B262 corresponds to the device B62 in the sixth system configuration example. The mobile network ER 263 relays communication between the terminal A261 and the HA 265. The fixed network ER 264 relays communication between the terminal B262 and the HA 265. The HA 265 corresponds to the move management server block 63 in the sixth system configuration example. The VPN GW 266 corresponds to the service providing block 64 in the sixth system configuration example.

At this time, the terminal A261 is connected to the terminal B262 via a PAN 267. The mobile network ER 263 is connected to the terminal A261 via a 3GPP access network 268 and connected to the HA 265 via an infrastructure network 270. The fixed network ER 264 is connected to the device B262 via a WLAN access network 269 and connected to the HA 265 via the infrastructure network 270. The VPN GW 266 is connected to the HA 265 via a service network 271.

Operation of Ninth System Configuration Example

Figure 15:
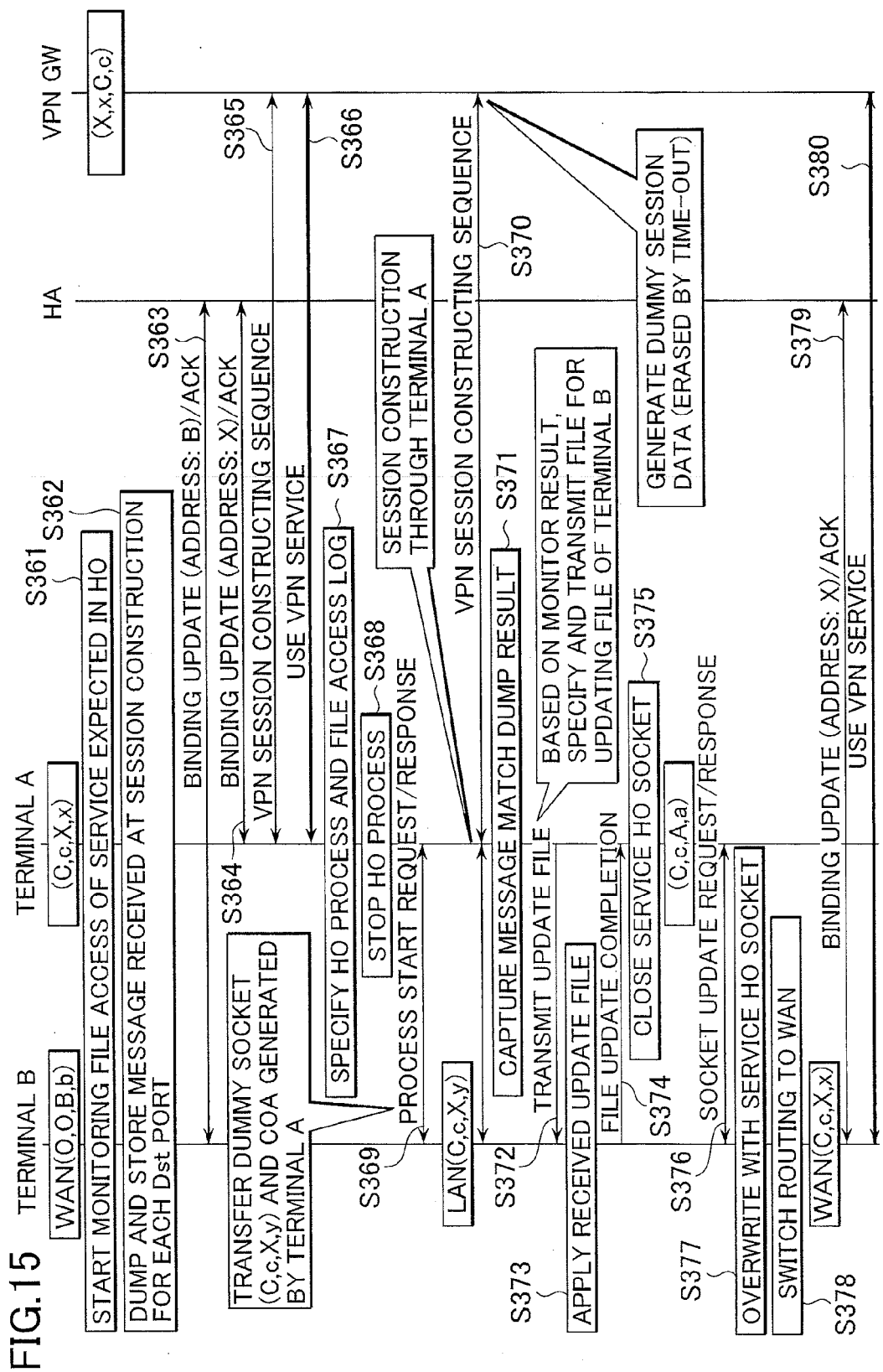
FIG. 15 is a sequence diagram showing a process in the ninth system configuration example.

Referring to FIG. 15, a process in the ninth system configuration example will be explained.

The terminal A261 is a terminal carried by a user and connected to the infrastructure network 270 via the 3GPP access network 268. It also has; an "IP address: A" and a "Port number: a" assigned by a service provider and the like for use in user data communication, and further has an "IP address: X" and a "Port number: x" for exclusive use of the communication service handover on the assumption that terminals are switched. The terminal B262 is connected to the infrastructure network 270 via the WLAN access network 269. It also has the "IP address: B" and the "Port number: b" assigned by a service provider and the like. The terminal A261 and the terminal B262 are connected to each other by a local network such as the PAN 267. The VPN GW 266 is arranged in the service network 271, having an "IP address: C" and a "Port number: c". The VPN GW 266 also terminates VPN tunneling such as SSL and IPsec. Note that X is mounted as an address with priority in the terminal A261 because of the assumption that terminals are switched constantly. These address use situations are shown in an uppermost area of processes carried out by the respective devices as shown in FIG. 15.

(1) Step S361

Now, it is assumed that a user tries to use a VPN service by using the terminal A261. The terminal A261 starts monitoring a file access by a VPN process, and also stores it as a log.

(2) Step S362

The terminal A261 dumps, for each "Destination Port Number", a message received in constructing a session with the VPN GW 266. The terminal A261 and the terminal A262 operate as a client of MobileIPv6. The HA 265 also operates as a server.

(3) Step S363

The terminal B262 transmits the HA 265 a "Binding Update" message regarding the address B, and receives a response from the HA 265.

(4) Step S364

The terminal A261 transmits the HA 265 a "Binding Update" message regarding the address X, and receives a response from the HA 265.

(5) Step S365

The terminal A261 carries out a session constructing sequence to use a VPN service with the VPN GW 266.

(6) Step S366

When the session constructing sequence is completed, the terminal A261 uses a VPN service.

(7) Step S367

Here, in a circumstance where a user wishes to switch terminals, the terminal A261 specifies a process desired to be handed over. This specification may be realized manually or automatically. The terminal A261 specifies, based on this specification, a file access log related to a HO process by referring to a file access log.

(8) Step S368

The terminal A261 stops the HO process which has been activated.

(9) Step S369

The terminal A261 traps an address used for the terminal B262 from a socket pool of itself or other appropriate address pool, and generates a dummy socket (having an "IP address: X" and a "Port number: y" in this case). The terminal A261 transmits the terminal B262 a process start request message including the dummy socket, and causes the HO process to start. Note that the terminal A261 at this time is set to transfer a packet of a specified type which is received from the terminal B262.

(10) Step S370

The terminal B262 receives the process start request message from the terminal A261, and applies the dummy socket, which was received from the terminal A261, thereto in association with communication in the PAN 267. As a result, the terminal B262 is switched to use the addresses X and y and specifies C for a communication party address. The terminal B262 further causes the HO process to start and carries out a session constructing sequence to use a VPN service with the VPN GW 266 in a form of passing through the terminal A261. Note that session data generated by the VPN GW 266 as a result of the sequence is not applicable in actual service usage and may be deleted in timeout.

(11) Step S371

The terminal A261 captures a session constructing message sent to the terminal B262 and confirms whether it matches to some extent (or is the same as or similar to) a message dump result obtained from session construction by itself.

(12) Step S372

If it is confirmed that the captured session constructing message matches to some extent a message dump result, the terminal A261 transmits the terminal B262 an access file related to the HO process by referring to a file access log and a group of files.

(13) Step S373

The terminal B262 updates or generates the access file received from the terminal A261 in association with the received process name.

(14) Step S374

When the file update is completed, the terminal B262 transmits a completion notification to the terminal A261.

(15) Step S375

The terminal A261 closes a socket (or addresses. X and x) used for user data communication and control data communication for exclusive use of the communication service handover. As a result, the terminal A261 is switched to use the address A.

(16) Step S376

The terminal A261 transmits the terminal B262 a message requesting to start using a socket for exclusive use of the communication service handover. Note that contents similar to this request message can be transmitted at the same timing as sending data in steps S379 and S372.

(17) Step S377

The terminal B262 applies the socket for exclusive use of the communication service handover received from the terminal A261 thereto.

(18) Step S378

The terminal B262 further changes the socket for exclusive use of the communication service handover in association with communication in the WAN access network 269 (i.e. switching between an I/F on a LAN side and an I/F on a WAN side). As a result, the terminal B262 is switched to use the addresses X and x, and specifies C for a communication party address.

(19) Step S379

The terminal B262 transmits the HA 265 a "Binding Update" message regarding the addresses X and x, and receives a response from the HA 265.

(20) Step S380

The terminal B262 determines a VPN service with the VPN GW 266 is handed over completely by a routing change made in the HA 265, and uses the VPN service.

Tenth System Configuration Example

A tenth system configuration example is based on the fourth system configuration example and there is shown a case where the communication service handover is carried out between routers.

Figure 16:
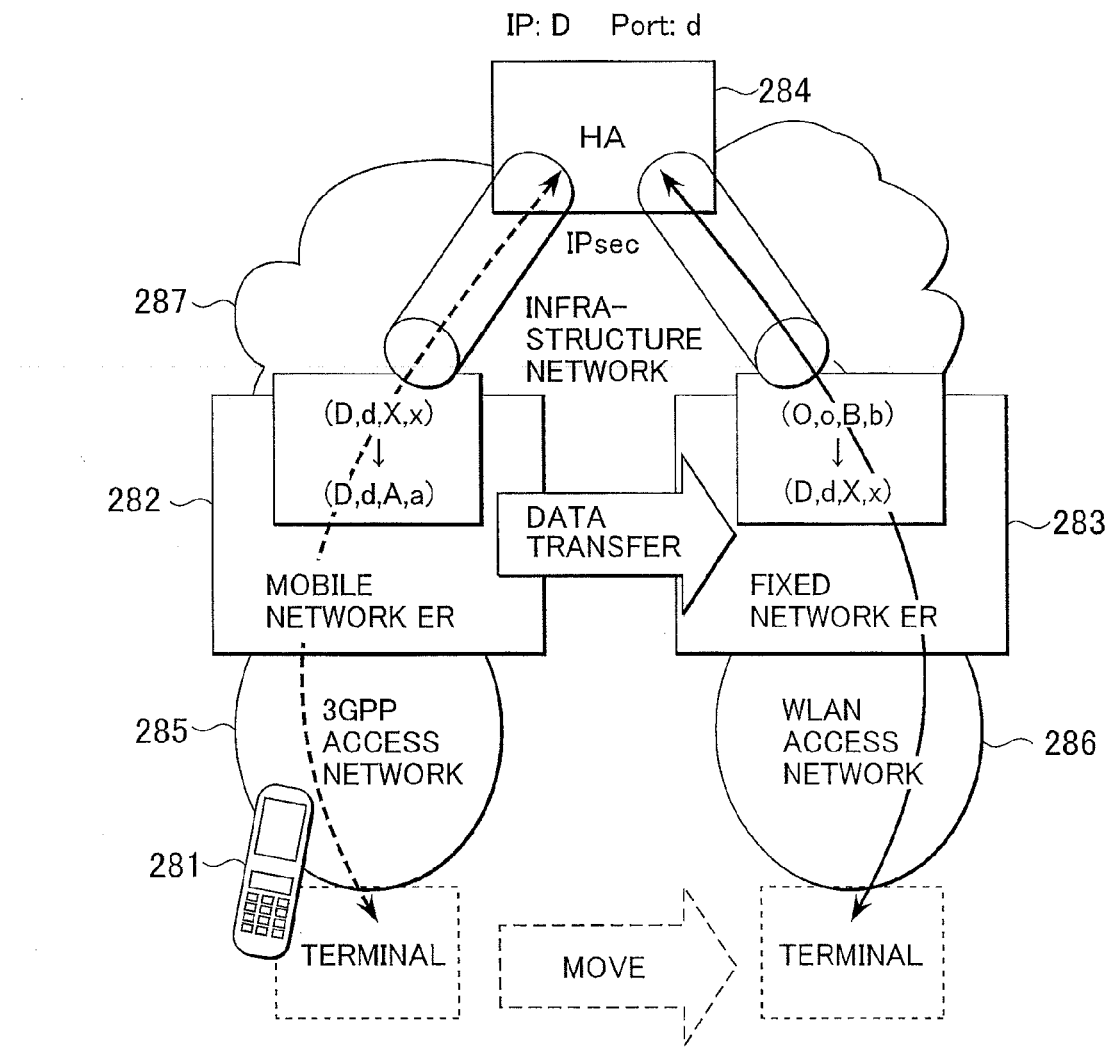
FIG. 16 is a block diagram showing a tenth system configuration example of the communication service handover system according to the present invention.

FIG. 16 shows the tenth system configuration example of the communication service handover system according to the present invention.

Referring to FIG. 16, the communication service handover system according to the present invention includes a terminal 281, a mobile network ER 282, a fixed network ER 283 and a HA 284.

Here, the terminal 281 corresponds to the device A1 in the fourth system configuration before the transition, and corresponds to the device B2 in the fourth system configuration example after the transition. The mobile network ER 282 relays communication between the terminal 281 and the HA 284. The fixed network ER 283 relays communication between the terminal 281 and the HA 284. The HA 284 corresponds to the move management server block 3 and the service providing block 4 in the fourth system configuration example.

At this time, the terminal 281 is moved from a communication area of the mobile network ER 282 to a communication area of the fixed network ER 283. The mobile network ER 282 is connected to the terminal 281 via a 3GPP access network 285 and connected to the HA 284 via an infrastructure network 287. The fixed network ER 283 is connected to the terminal 281 via a WLAN access network 286 and connected to the HA 284 via the infrastructure network 287.

Operation of Tenth System Configuration Example

Referring to FIG. 17, a process in the tenth system configuration example will be explained.

The mobile network ER 282 is a router placed on an edge of the infrastructure network 287 and stores the terminal 281 connected thereto via the 3GPP access network 285. The fixed network ER 283 is a router placed on an edge of the infrastructure network 287 and stores the terminal 281 connected thereto via the WLAN access network 286. Each of the mobile network ER 282 and the fixed network ER 283 employs a form of taking over and mounting a client block which is usually held by a subordinate terminal, or proxy-type architecture.

The mobile network ER 282 has the "IP address: A" and the "Port number: a" assigned by a service provider and the like for use in user data communication. The mobile network ER 282 further has the "IP address: X" and the "Port Number: x" for exclusive use of the communication service handover on the assumption that routers are switched in accordance with the move of the terminal 281. The fixed network ER 283 has the "IP address: B" and the "Port number: b" assigned by a service provider and the like.

The HA 284 has an "IP address: D" and a "Port number: d". The HA 284, which operates as a home agent of MobileIPv6, needs to have an ability to decrypt a "Binding Update" message which was sent from the terminal 281 and encrypted by IPsec. That is, an IPsec tunnel is constructed constantly between the mobile network ER 282 and the fixed network ER 283.

Note that X is mounted as an address with priority in the mobile network ER 282 because of the assumption that routers are switched constantly in accordance with the move of the terminal 281. These address use situations are shown in an upper most area of processes carried out by the respective devices as shown in FIG. 17.

(1) Step S401

Now, it is assumed that a user tries to transmit a position registration message to the HA 284 via the mobile network ER 282 by using the terminal A281. The mobile network ER 282 starts monitoring a file access by an IPsec process, and also stores it as a log. The mobile network ER 282 and the fixed network ER 283 operate as a client of MobileIPv6. The HA 284 also operates as a server.

(2) Step S402

If a user who holds the terminal 281 moves into an area managed under the mobile network ER 282, a position registration request of an L2 level is transmitted from the terminal 281 to the mobile network ER 282. At this time, the terminal 281, which moved into the area managed under the mobile network ER 282, transmits the position registration request of the L2 level to the mobile network ER 282.

(3) Step S403

The mobile network ER 282 carries out an Ipsec session constructing sequence with the HA 284.

(4) Step S404

When the IPsec session constructing sequence is completed, the mobile network ER 282 encrypts a "Binding update" message regarding the address B by IPsec and transmits it to the HA 284, followed by receiving "Ack" from the HA 284. Note that "Ack" is a positive reply (or response) sent from a transmission source to a transmission destination.

(5) Step S405

When "Ack" is received from the HA 284, the mobile network ER 282 transmits the terminal 281 the position registration response of the L2 level.

(6) Step S406

Here, it is assumed that a location is changed by a user who holds the terminal 281. Here, the terminal 281 comes out of the area managed under the mobile network ER 282 and moves into an area managed under the fixed network ER 283.

(7) Step S407

The terminal 281, which moved into the area managed under the fixed ER 283, transmits the fixed network ER 283 the position registration request of the L2 level.

(8) Step S408

The fixed network ER 283 transmits the mobile network ER 282 a handover across the routers of a user. Here, the fixed network ER 283 transmits a HO request to the mobile network ER 282.

(9) Step S409

The mobile network ER 282 specifies an access file related to a HO process by referring to a file access log and a group of files related to the IPsec process.

(10) Step S410

The mobile network ER 282 stops an HO process having been activated.

(11) Step S411

The mobile network ER 282 dumps a memory used by the HO process at this timing.

(12) Step S412

The mobile network ER 282 transmits the fixed network ER 283 the memory dump and the access file related to the HO process in association with a name of the IPsec process.

(13) Step S413

The fixed network ER 283 updates or generates the memory dump and the access file received from the mobile network ER 282 in association with the received process name. A this time, the fixed network ER 283 generates a structure by which the HO process and the HO socket are made to correspond to each other, wherein it is also possible to generate, for enhancing efficiency, as needed, a structure model by carrying out a session constructing sequence to use an IPsec service with the HA 284. Note that the fixed network ER 283 uses the address B or other addresses in session construction at this time.

(14) Step S414

When the file update is completed, the fixed network ER 283 transmits a completion notification to the mobile network ER 282.

(15) Step S415

The mobile network ER 282 closes a socket (or address X) used for user data communication and control data communication for exclusive use of the communication service handover. As a result, the mobile network ER 282 is switched to use the address A.

(16) Step S416

The mobile network ER 282 transmits the fixed network ER 283 a message requesting to start using a socket for exclusive use of the communication service handover. Note that contents similar to this request message can also be transmitted at the same time as sending data in step S412.

(17) Step S417

The fixed network ER 283 applies the socket for exclusive use of the communication service handover received from the mobile network ER 282 thereto. As a result, the fixed network ER 283 is switched to use the address X and specifies D for a communication party address.

(18) Step S418

The fixed network ER 283 applies the memory dump, which was received from the mobile network ER 282, thereto at this timing in association with the received process name, and restarts an HO process.

(19) Step S419

The fixed network ER 283 carries out an IP sec session constructing sequence with the HA 284.

(20) Step S420

When the IPsec session constructing sequence is completed, the fixed network ER 283 encrypts a "Binding Update" message regarding the address X by IPsec and transmits it to the HA 284, followed by receiving "Ack" from the HA 284.

(21) Step S421

When "Ack" is received from the HA 284, the fixed network ER 283 determines the IPsec service with the HA 284 is handed over completely by transmitting a position registration response of the L2 level to the terminal 28, and uses the IPsec service.

According to the present invention, in the communication service handover in which a communication service used by a user in a certain device is continuously used in other devices, the followings are made possible:

(1) Communication service handover is realized without adding functions on a network side;

(2) Existing service application can be used by both a client and a server; and (3) Service transition can be achieved with respect to Web access, streaming, authentication or arbitrary application such as VPN.

As explained above, the present invention relates to a method for the communication service handover in which a communication service used by a user in a certain device is continuously used in other devices, and in particular, relates to a method for realizing the communication service handover without adding functions on a network side.

If a sequence such as "3rd Party Call" and "Call Transfer" is applied as a method for the communication service handover, interaction is needed between a SIP module and a service application.

Also, in the case of mounting middleware with independently defined state description for each service application, it is similarly necessary to correspond to each service application, in addition to require interaction between the middleware and the service application.

Moreover, if a virtual socket is introduced, it is necessary to newly prepare a service application in which API used for virtual socket is mounted.

Furthermore, in mounting a platform such as JAVA (registered trademark) and VMware (registered trademark), it is accompanied by necessity of newly preparing a service application with "JAVA (registered trademark) API" mounted therein, and necessity of integrally transferring components ranged from OS to application.

In addition, many of the methods for the communication service handover require additional mounting on a server side to realize the communication service handover.

To achieve the above object, the present invention is configured by including at least a service providing function, a move management server function, a file access log generation function, an HO process specification function, a first process control function, a socket control function, a data transmission function, a socket update request function, a first move management CL function, a session construction function for constructing a session, a file generation function, a first communication function, a second process control function, a file update function, a socket control function, a second move management CL function, and a second communication function.

The service providing function provides user with service. The move management server function manages a move of a client on the server side. The file access log generation function is mounted in the device A and generates a log of a file access by a process. The HO process specification function determines a process to be handed over by user specification. The first process control function acts to stop a process and the like. The socket control function acts to close a socket and the like. The data transmission function transmits necessary data to the device B. The socket update request function requests the device B to update a socket. The first move management CL function transmits, on a client side, a position registration message to the move management server function. The session construction function constructs a session to use a service with the service providing function. The file generation function generates a file handled by a process. The first communication function communicates with an external function of the device. The second process control function is mounted in the device B and controls a process. The file update function applies a file received from the device A thereto. The socket control function applies socket information received from the device A thereto. The second move management CL function transmits, on the client side, a position registration message to the move management server function. The second communication function communicates with an external function of the device.

Features of the present invention will be described below.

The method for the communication service handover is a method by which a communication service used by a user in a first device is continuously used in a second device, including a service providing function, a move management server function, a file access log generation function, an HO process specification function, a first process control function, a socket control function, a data transmission function, a socket update request function, a first move management CL function, a session construction function, a file generation function, a first communication function, a memory dump function, a second process control function, a file update function, a socket control function, a second move management CL function, a second communication function, and a memory update function, and further including a session construction function in some cases.

The service providing function provides user with service. The move management server function manages a move of a client on the server side. The file access log generation function is mounted in the first device and generates a log of a file access by a process. The HO process specification function determines a process to be handed over by user specification. The first process control function acts to stop a process and the like. The socket control function acts to close a socket and the like. The data transmission function transmits necessary data to the second device. The socket update request function requests the second device to update a socket. The first move management CL function transmits, on the client side, a position registration message to the move management server function. The session construction function constructs a session to use a service with the service providing function. The file generation function generates a file handled by a process. The first communication function communicates with an external function of the device. The memory dump function dumps a memory used by a process at a certain timing. The second process control function is mounted in the second device and controls a process. The file update function applies a file received from the first device thereto. The socket control function applies socket information received from the first device thereto. The second move management CL function transmits, on the client side, a position registration message to the move management server function. The second communication function communicates with an external function of the device. The memory update function applies a memory dump received from the first device thereto. The session construction function constructs a session to use a service with the service providing function.

The first device is provided with, at least, the file access log generation function, the HO process specification function, the process control function, the socket control function, the data transmission function, the socket update request function, the move management CL function, the session construction function, the file generation function, the communication function, and the memory dump function.

The file access log generation function generates a log of a file access by a process. The HO process specification function determines a process to be handed over by user specification. The process control function acts to stop a process and the like. The socket control function acts to close a socket and the like. The data transmission function transmits necessary data to the second device. The socket update request function requests the second device to update a socket. The move management CL function transmits, on the client side, a position registration message to the move management server function. The session construction function constructs a session to uses service with the service providing function. The file generation function generates a file handled by a process. The communication function communicates' with an external function of the device. The memory dump function dumps a memory used by a process at a certain timing.

The second device is provided with, at least, the process control function for controlling a process, the file update function for applying a file received from the first device thereto, the socket control function for applying socket information received from the first device thereto, the move management CL function for transmitting, on the client side, a position registration message to the move management server function, the communication function for communicating with an external function of the device, and the memory update function for applying a memory dump received from the first device thereto, and further provided with, in some cases, the session construction function for constructing a session to use a service with the service providing function.

The file access log generation function provided in the first device has means adapted to generate a log of a file access by a process. The HO process specification function provided in the first device has means adapted to determine a process to be handed over by user specification. The process control function provided in the first device has means adapted to act to stop a process and the like. The socket control function provided in the first device has means adapted to act to close a socket and the like. The data transmission function provided in the first device has means adapted to transmit necessary data to the second device. The socket update request function provided in the first device has means adapted to request the second device to update a socket. The move management CL function provided in the first device has means adapted to transmit, on the client side, a position registration message to the move management server. The session construction function provided in the first device has means adapted to construct a session to use a service with the service providing function. The file generation function provided in the first device has means adapted to generate a file which is handled by a process. The communication function provided in the first device has means adapted to communicate with an external function of the device. The memory dump function provided in the first device has means adapted to dump a memory used by a process at a certain timing.

The process control function provided in the second device has means adapted to control a process. The file update function provided in the second device has means adapted to apply a file received from the first device thereto. The socket control function provided in the second device has means adapted to apply socket information received from the first device thereto. The move management CL function provided in the second device has means adapted to transmit, on the client side, a position registration message to the move management server function. The communication function provided in the second device has means adapted to communicate with an external function of the device. The memory update function provided in the second device has means adapted to apply a memory dump received from the first device thereto. The session construction function provided in the second device has means adapted to construct a session to use a service with the service providing means.

From another aspect, the method for communication service handover according to the present invention is a method by which a communication service used by a user in a first device is continuously used in a second device, including a service providing function, a move management server function, a file access log generation function, an HO process specification function, a first process control function for stopping a process and the like, a socket control function, a data transmission function, a socket update request function, a first move management CL function, a session construction function, a file generation function, a first communication function, a process start request function, a second process control function, a file update function, a socket control function, a second move management CL function, a second communication function, a log match determining function, a file transmission request function and a session construction function.

The service providing function, which corresponds to a method by which a communication service used by a user in the first device is continuously used in the second device, provides user with service. The move management server function manages, on a server side, a move of a client. The file access log generation function is mounted in the first device and generates a log of a file access by a process. The HO process specification function determines a process to be handed over by user specification. The first process control function acts to stop a process and the like. The socket control function acts to close a socket and the like. The data transmission function transmits necessary data to the second device. The socket update request function requests the second device to update a socket. The first move management CL function transmits, on a client side, a position registration message to the move management server function. The session construction function constructs a session to use a service with the service providing function. The file generation function generates a file handled by a process. The first communication function communicates with an external function of the device. The process start request function causes the second device to start a process. The second process control function is mounted on the second device and controls a process. The file update function applies a file received from the first device thereto. The socket control function applies socket information received from the first device thereto. The second move management CL function transmits, on the client side, a position registration message to the move management server function. The second communication function communicates with an external function of the device. The log match determining function determines whether a file access log received from the first device matches a log of a sequence process executed by itself. The file transmission request function requests, in response to a log match, the first device to transmit a file. The session construction function constructs a session to use a service with the service providing function.

The first device is provided with, at least, the file access log generation function for generating a log of a file access by a process, the HO process specification function for determining a process to be handed over by user specification, the process control function for stopping a process and the like, the socket control function for closing a socket and the like, the data transmission function for transmitting necessary data to the second device, the socket update request function for requesting the second device to update a socket, the move management CL function for transmitting, on the client side, a position registration message to the move management server function, the session construction function for constructing a session to use a service with the service providing function, the file generation function for generating a file which is handled by a process, the communication function for communicating with an external function of the device, and the process start request function for causing the second device to start a process.

The second device is provided with, at least, the process control function for controlling a process, the file update function for applying a file received from the first device thereto, the socket control function for applying socket information received from the first device thereto, the move management CL function for transmitting, on the client side, a position registration message to the move management server function, the communication function for communicating with an external function of the device, the log match determining function for determining whether a file access log received from the first device matches a log of a sequence process executed by itself, the file transmission request function for requesting, in response to a log match, the first device to transmit a file, and the session construction function for constructing a session to use a service with the service providing function.

The file access log generation function provided in the first device has means adapted to generate a log of a file access by a process. The HO process specification function provided in the first device has means adapted to determine a process to be handed over by user specification. The process control function provided in the first device has means adapted to act to stop a process and the like. The socket control function provided in the first device has means adapted to act to close a socket and the like. The data transmission function provided in the first device has means adapted to transmit necessary data to the second device. The socket update request function provided in the first device has means adapted to request the second device to update a socket. The move management CL function provided in the first device has means adapted to transmit, on the client side, a position registration message to the move management server function. The session construction function provided in the first device has means adapted to construct a session to use a service with the service providing function. The file generation function provided in the first device has means adapted to generate a file handled by a process. The communication function provided in the first device has means adapted to communicate with an external function of the device. The process start request function provided in the first device has means adapted to cause the second device to start a process.

The process control function provided in the second device has means adapted to control a process. The file update function provided in the second device has means adapted to apply a file received from the first device thereto. The socket control function provided in the second device has means adapted to apply socket information received from the first device thereto. The move management CL function provided in the second device has means adapted to transmit, on the client side, a position registration message to the move management server function. The communication function provided in the second device has means adapted to communicate with an external function of the device. The log match determining function provided in the second device has means adapted to determine whether a file access log received from the first device matches a log of a sequence process executed by itself. The file transmission request function provided in the second device has means adapted to request, in response to a log match, the first device to transmit a file. The session construction function provided in the second device has means adapted to construct a session to use a service with the service providing function.

From yet another aspect, the method for communication service handover according to the present invention is a method by which a communication service used by a user in a first device is continuously used in a second device, including a service providing function, a move management server function, a file access log generation function, an HO process specification function, a first process control function, a socket control function, a data transmission function, a socket update request function, a first move management CL function, a session construction function, a file generation function, a first communication function, a message dump function, a message match determining function, a process start request function, a dummy socket generation function, a transfer function, a second process control function, a file update function, a socket control function, a second move management CL function, a second communication function, a dummy socket application function, a routing update function, and a session construction function.

The service providing function provides user with service. The move management server function manages a move of a client on a server side. The file access log generation function is mounted in the first device and generates a log of a file access by a process. The HO process specification function determines a process to be handed over by user specification. The first process control function acts to stop a process and the like. The socket control function acts to close a socket and the like. The data transmission function transmits necessary data to the second device. The socket update request function requests the second device to update a socket. The first move management CL function transmits, on a client side, a position registration message to the move management server function. The session construction function constructs a session to use a service with the service providing function. The file generation function generates a file which is handled by a process. The first communication function communicates with an external function of the device. The message dump function dumps, for each "Destination Port Number", a message received in session construction. The message match determining function captures a session constructing message to be sent to the second device, and determines whether it matches to some extent (or is the same as or similar to) a message dump result obtained from session construction by itself. The process start request function causes the second device to start a process. The dummy socket generation function traps an address used for the second device from a socket pool of itself and generates a dummy socket. The transfer function transfers a packet exchanged between the second device and the service providing function. The second process control function is mounted in the second device and controls a process. The file update function applies a file received from the first device thereto. The socket control function applies socket information received from the first device thereto. The second move management CL function transmits, on the client side, a position registration message to the move management server function. The second communication function communicates with an external function of the device. The dummy socket application function applies a dummy socket received from the first device thereto. The routing update function switches routing between an I/F on a LAN side and an I/F on a WAN side. The session construction function constructs a session to use a service with the service providing function.

The first device is provided with, at least, the file access log generation function for generating a log of a file access by a process, the HO process specification function for determining a process to be handed over by user specification, the process control function for stopping a process and the like, the socket control function for closing a socket and the like, the data transmission function for transmitting necessary data to the second device, the socket update request function for requesting the second device to update a socket, the move management CL function for transmitting, on the client side, a position registration message to the move management server function, the session construction function for constructing a session to use a service with the service providing function, the file generation function for generating a file which is handled by a process, the communication function for communicating with an external function of the device, the message dump function for dumping, for each "Destination Port Number", a message received in session construction, the message match determining function for capturing a session constructing message to be sent to the second device and determining whether it matches to some extent (or is the same as or similar to) a message dump result obtained from session construction by itself, the process start request function for causing the second device to start a process, the dummy socket generation function for trapping an address used for the second device from a socket pool of itself and generating a dummy socket, and the transfer function for transferring a packet exchanged between the second device and the service providing function.

The second device is provided with, at least, the process control function for controlling a process, the file update function for applying a file received from the first device thereto, the socket control function for applying socket information received from the first device thereto, the move management CL function for transmitting, on the client side, a position registration message to the move management server function, the communication function for communicating with an external function of the device, a dummy socket application function for applying a dummy socket received from the first device thereto, the routing update function for switching routing between the I/F on the LAN side and the I/F on the WAN side, and the session construction function for constructing a session to use a service with the service providing function.

The file access log generation function provided in the first device has means adapted to generate a log of a file access by a process. The HO process specification function provided in the first device has means adapted to determine a process to be handed over by user specification. The process control function provided in the first device has means adapted to act to stop a process and the like. The socket control function provided in the first device has means adapted to act to close a socket and the like. The data transmission function provided in the first device has means adapted to transmit necessary data to the second device. The socket update request function provided in the first device has means adapted to request the second device to update a socket. The move management CL function provided in the first device has means adapted to transmit, on the client side, a position registration message to the move management server function. The session construction function provided in the first device has means adapted to construct a session to use a service with the service providing function. The file generation function provided in the first device has means adapted to generate a file which is handled by a process. The communication function provided in the first device has means adapted to communicate with an external function of the device. The message dump function provided in the first device has means adapted to dump, for each "Destination Port Number", a message received in session construction. The message match determining function provided in the first device captures a session constructing message to be sent to the second device and determines whether it matches to some extent (or is the same as or similar to) a message dump result obtained from session construction by itself. The process start request function provided in the first device has means adapted to cause the second device to start a process. The dummy socket generation function provided in the first device has means adapted to trap an address used for the second device from a socket pool of itself and generate a dummy socket. The transfer function provided in the first device has means adapted to transfer a packet exchanged between the second device and the service providing function.

The process control function provided in the second device has means adapted to control a process. The file update function provided in the second device has means adapted to apply a file received from the first device thereto. The socket control function provided in the second device has means adapted to apply socket information received from the first device thereto. The move management CL function provided in the second device has means adapted to transmit, on the client side, a position registration message to the move management server function. The communication function provided in the second device has means adapted to communicate with an external function of the device. The dummy socket application function provided in the second device has means adapted to apply a dummy socket received from the first device thereto. The routing update function provided in the second device has means adapted to switch routing between the I/F on the LAN side and the I/F on the WAN side. The session construction function provided in the second device has means adapted to construct a session to use a service with the service providing function.

The network system according to the present invention is a network system in which a communication service used by a user in the first device is continuously used in the second device, including a service providing function, a move management server function, a file access log generation function, an HO process specification function, a process control function, a socket control function, a data transmission function, a socket update request function, a first move management CL function, a session construction function, a file generation function, a first communication function, a memory dump function, a process control function, a file update function, a socket control function, a second move management CL function, a second communication function, and a memory update function, and further includes a session construction function in some cases.

The service providing function provides user with service. The move management server function manages a move of a client on the server side. The file access log generation function is mounted in the first device and generates a log of a file access by a process. The HO process specification function determines a process to be handed over by user specification. The process control function acts to stop a process and the like. The socket control function acts to close a socket and the like. The data transmission function transmits necessary data to the second device. The socket update request function requests the second device to update a socket. The first move management CL function transmits, on the client side, a position registration message to the move management server function. The session construction function constructs a session to use a service with the service providing function. The file generation function generates a file which is handled by a process. The first communication function communicates with an external function of the device. The memory dump function dumps a memory used by a process at a certain timing. The process control function is mounted in the second device and controls a process. The file update function applies a file received from the first device thereto. The socket control function applies socket information received from the first device thereto. The second move management CL function transmits, on the client side, a position registration message to the move management server function. The second communication function communicates with an external function of the device. The memory update function applies a memory dump received from the first device thereto. The session construction function further constructs, in some cases, a session to use a service with the service providing function.

The first device is provided with, at least, the file access log generation function for generating a log of a file access by a process, the HO process specification function for determining a process to be handed over by user specification, the process control function for stopping a process and the like, the socket control function for closing a socket and the like, the data transmission function for transmitting necessary data to the second device, the socket update request function for requesting the second device to update a socket, the move management CL function for transmitting, on the client side, a position registration message to the move management server function, the session construction function for constructing a session to use a service with the service providing function, the file generation function for generating a file handled by a process, the communication function for communicating with an external function of the device, and the memory dump function for dumping a memory used by a process at a certain timing.

The second device is provided with, at least, the process control function for controlling the process, the file update function for applying a file received from the first device thereto, the socket control function for applying socket information received from the first device thereto, the move management CL function for transmitting, on the client side, a position registration message to the move management server function, the communication function for communicating with an external function of the device, and the memory update function for applying a memory dump received from the first device thereto, and further provided with, in some cases, the session construction function for constructing a session to use a service with the service providing function.

The file access log generation function provided in the first device has means adapted to generate a log of a file access by a process. The HO process specification function provided in the first device has means adapted to determine a process to be handed over by user specification. The process control function provided in the first device has means adapted to act to stop a process and the like. The socket control function provided in the first device has means adapted to act to close a socket and the like. The data transmission function provided in the first device has means adapted to transmit necessary data to the second device. The socket update request function provided in the first device has means adapted to request the second device to update a socket. The move management CL function provided in the first device has means adapted to transmit, on the client side, a position registration message to the move management server function. The session construction function provided in the first device has means adapted to construct a session to use a service with the service providing function. The file generation function provided in the first device has means adapted to generate a file which is handled by a process. The communication function provided in the first device has means adapted to communicate with an external function of the device. The memory dump function provided in the first device has means adapted to dump a memory used by a process at a certain timing. The process control function provided in the second device has means adapted to control a process. The file update function provided in the second device has means adapted to apply a file received from the first device thereto. The socket control function provided in the second device has means adapted to apply socket information received from the first device thereto. The move management CL function provided in the second device has means adapted to transmit, on the client side, a position registration message to the move management server function. The communication function provided in the second device has means adapted to communicate with an external function of the device. The memory update function provided in the second device has means adapted to apply a memory dump received from the first device thereto. The session construction function provided in the second device has means adapted to construct a session to use a service with the service providing function.

From a further aspect, the network system according to the present invention is a network system in which a communication service used by a user in a first device is continuously used in a second device, including a service providing function for providing user with service, a move management server function for managing a move of a client on a server side, a file access log generation function mounted in the first device for generating a log of a file access by a process, an HO process specification function for determining a process to be handed over by user specification, a process control function for stopping a process and the like, a socket control function for closing a socket and the like, a data transmission function for transmitting necessary data to the second device, a socket update request function for requesting the second device to update a socket, a first move management CL function for transmitting, on a client side, a position registration message to the move management server function, a session construction function for constructing a session to use a service with the service providing function, a file generation function for generating a file which is handled by a process, a first communication function for communicating with an external function of the device, a process start request function for causing the second device to start a process, a process control function mounted in the second device for controlling a process, a file update function for applying a file received from the first device thereto, a socket control function for applying socket information received from the first device thereto, a second move management CL function for transmitting, on the client side, a position registration message to the move management server function, a second communication function for communicating with an external function of the device, a log match determining function for determining whether a file access log received from the first device matches a log of a sequence process executed by itself, a file transmission request function for requesting, in response to a log match, the first device to transmit a file, and a session construction function for constructing a session to use a service with the service providing function.

The service providing function provides user with service. The move management server function manages a move of a client on the server side. The file access log generation function is mounted in the first device and generates a log of a file access by a process. The HO process specification function determines a process to be handed over by user specification. The process control function acts to stop a process and the like. The socket control function acts to close a socket and the like. The data transmission function transmits necessary data to the second device. The socket update request function requests the second device to update a socket. The move management CL function transmits, on the client side, a position registration message to the move management server function. The session construction function constructs a session to use a service with the service providing function. The file generation function generates a file which is handled by a process. The first communication function communicates with an external function of the device. The process start request function causes the second device to start a process. The process control function is mounted in the second device and controls a process. The file update function applies a file received from the first device thereto. The socket control function applies socket information received from the first device thereto. The move management CL function transmits, on the client side, a position registration message to the move management server function. The second communication function communicates with an external function of the device. The log match determining function determines whether a file access log received from the first device matches a log of a sequence process executed by itself. The file transmission request function requests, in response to a log match, the first device to transmit a file. The session construction function constructs a session to use a service with the service providing function.

The first device is provided with, at least, the file access log generation function for generating a log of a file access by a process, the HO process specification function for determining a process to be handed over by user specification, the process control function for stopping a process and the like, the socket control function for closing a socket and the like, the data transmission function for transmitting necessary data to the second device, the socket update request function for requesting the second device to update a socket, the move management CL function for transmitting, on the client side, a position registration message to the move management server function, the session construction function for constructing a session to use a service with the service providing function, the file generation function for generating a file handled by a process, the communication function for communicating with an external function of the device, and the process start request function for causing the second device to start a process.

The second device is provided with, at least, the process control function for controlling a process, the file update function for applying a file received from the first device thereto, the socket control function for applying socket information received from the first device, the move management CL function for transmitting, on the client side, a position registration message to the move management server function, the communication function for communicating with an external function of the device, the log match determining function for determining whether a file access log received from the first device matches a log of a sequence process executed by itself, the file transmission request function for requesting, in response to a log match, the first device to transmit a file, and the session construction function for constructing a session to use a service with the service providing function.

The file access log generation function provided in the first device has means adapted to generate a log of a file access by a process. The HO process specification function provided in the first device has means adapted to determine a process to be handed over by user specification. The process control function provided in the first device has means adapted to act to stop a process and the like. The socket control function provided in the first device has means adapted to act to close a socket and the like. The data transmission function provided in the first device has means adapted to transmit necessary data to the second device. The socket update request function provided in the first device has means adapted to request the second device to update a socket. The move management CL function provided in the first device has means adapted to transmit, on the client side, a position registration message to the move management server function. The session construction function provided in the first device has means adapted to construct a session to use a service with the service providing function. The file generation function provided in the first device has means adapted to generate a file handled by a process. The communication function provided in the first device has means adapted to communicate with an external function of the device. The process start request function provided in the first device has means adapted to cause the second device to start a process.

The process control function provided in the second device has means adapted to control a process. The file update function provided in the second device has means adapted to apply a file received from the first device thereto. The socket control function provided in the second device has means adapted to apply socket information received from the first device thereto. The move management CL function provided in the second device has means adapted to transmit, on the client side, a position registration message to the move management server function. The communication function provided in the second device has means adapted to communicate with an external function of the device. The log match determining function provided in the second device has means adapted to determine whether a file access log received from the first device matches a log of a sequence process executed by itself. The file transmission request function provided in the second device has means adapted to request, in response to a log match, the first device to transmit a file. The session construction function provided in the second device has means adapted to construct a session to use a service with the service providing function.

From a yet further aspect, the network system according to the present invention is a network system in which a communication service used by a user in a first device is continuously used in a second device, including a service providing function, a move management server function, a file access log generation function, an HO process specification function, a first process control function, a socket control function, a data transmission function, a socket update request function, a first move management CL function, a session construction function, a file generation function, a first communication function, a message dump function, a message match determining function, a process start request function, a dummy socket generation function, a transfer function, a second process control function, a file update function, a socket control function, a second move management CL function, a second communication function, a dummy socket application function, a routing update function, and a session construction function.

The service providing function provides user with service. The move management server function manages a move of a client on a server side. The file access log generation function is mounted in the first device and generates a log of a file access by a process. The HO process specification function determines a process to be handed over by user specification. The first process control function acts to stop a process and the like. The socket control function acts to close a socket and the like. The data transmission function transmits necessary data to the second device. The socket update request function requests the second device to update a socket. The first move management CL function transmits, on a client side, a position registration message to the move management server function. The session construction function constructs a session to use a service with the service providing function. The file generation function generates a file handled by a process. The first communication function communicates with an external function of the device. The message dump function dumps, for each "Destination Port Number", a message received in session construction. The message match determining function captures a session constructing message to be sent to the second device, and determines whether it matches to some extent (or is the same as or similar to) a message dump result obtained from session construction by itself. The process start request function causes the second device to start a process. The dummy socket generation function traps an address used for the second device from a socket pool of itself and generates a dummy socket. The transfer function transfers a packet exchanged between the second device and the service providing function. The second process control function is mounted on the second device and controls a process. The file update function applies a file received from the first device thereto. The socket control function applies socket information received from the first device thereto. The second move management CL function transmits, on the client side, a position registration message to the move management server function. The second communication function communicates with an external function of the device. The dummy socket application function applies a dummy socket received from the first device thereto. The routing update function switches routing between an I/F on a LAN side and an I/F on a WAN side. The session construction function constructs a session in order to use a service with the service providing function.

The first device is provided with, at least, the file access log generation function, the HO process specification function, the process control function, the socket control function, the data transmission function, the socket update request function, the move management CL function, the session construction function, the file generation function, the communication function, the message dump function, the message match determining function, the process start request function, the dummy socket generation function, and the transfer function.

The file access log generation function generates a log of a file access by a process. The HO process specification function determines a process to be handed over by user specification. The process control function acts to stop a process and the like. The socket control function acts to close a socket and the like. The data transmission function transmits necessary data to the second device. The socket update request function requests the second device to update a socket. The move management CL function transmits, on the client side, a position registration message to the move management server function. The session construction function constructs a session to use a service with the service providing function. The file generation function generates a file handled by a process. The communication function communicates with an external function of the device. The message dump function dumps, for every "Destination Port Number", a message received in session construction. The message match determining function captures a session constructing message to be sent to the second device and determines whether it matches to some extent (or is the same as or similar to) a message dump result obtained from session construction by itself. The process start request function causes the second device to start a process. The dummy socket generation function traps an address used for the second device from a socket pool of itself and generates a dummy socket. The transfer function transfers a packet exchanged between the second device and the service providing function.

The second device is provided with, at least, the process control function for controlling a process, the file update function for applying a file received from the first device thereto, the socket control function for applying socket information received from the first device thereto, the move management CL function for transmitting, on the client side, a position registration message to the move management server function, the communication function for communicating with an external function of the device, the dummy socket application function for applying a dummy socket received from the first device, the routing update function for switching routing between the I/F on the LAN side and the I/F on the WAN side, and the session construction function for constructing a session to use a service with the service providing function.

The file access log generation function provided in the first device has means adapted to generate a log of a file access by a process. The HO process specification function provided in the first device has means adapted to determine a process to be handed over by user specification. The process control function provided in the first device has means adapted to act to stop a process and the like. The socket control function provided in the first device has means adapted to act to close a socket and the like. The data transmission function provided in the first device has means adapted to transmit necessary data to the second device. The socket update request function provided in the first device has means adapted to request the second device to update a socket. The move management CL function provided in the first device has means adapted to transmit, on the client side, a position registration message to the move management server. The session construction function provided in the first device has means adapted to construct a session to use a service with the service providing function. The file generation function provided in the first device has means adapted to generate a file handled by a process. The communication function provided in the first device has means adapted to communicate with an external function of the device. The message dump function provided in the first device has means adapted to dump, for each "Destination Port Number", a message received in session construction. The message match determining function provided in the first device has means adapted to capture a session constructing message to be sent to the second device and determine whether it matches to some extent (or is the same as or similar to) a message dump result obtained from session construction by itself. The process start request function provided in the first device has means adapted to cause the second device to start a process. The dummy socket generation function provided in the first device has means adapted to trap an address used for the second device from a socket pool of itself and generate a dummy socket. The transfer function provided in the first device has means adapted to transfer a packet exchanged between the second device and the service providing function.

The process control function provided in the second device has means adapted to control a process. The file update function provided in the second device has means adapted to apply a file received from the first device thereto. The socket control function provided in the second device has means adapted to apply socket information received from the first device thereto. The move management CL function provided in the second device has means adapted to transmit, on the client side, a position registration message to the move management server function. The communication function provided in the second device has means adapted to communicate with an external function of the device. The dummy socket application function provided in the second device has means adapted to apply a dummy socket received from the first device thereto. The routing update function provided in the second device has means adapted to switch routing between the I/F on the LAN side and the I/F on the WAN side. The session construction function provided in the second device has means adapted to construct a session to use a service with the service providing function.

The exemplary embodiments of the present invention as described in detail above are not limited thereto in practice and any changes made in a range without deviating from the gist of the present invention are also included in the present invention.

Note that the present application claims priority based on Japanese patent application No. 2008-103217 and the disclosure of Japanese patent application No. 2008-103217 is incorporated by reference in the present application.

The invention claimed is:

1. A communication service handover system in which a communication service used by a user by a first communication device is continuously used by a second communication device,
   wherein said first communication device and said second communication device are distinct from each other,
   wherein the communication service handover system comprises:
   a socket update request block configured on said first communication device to request said second communication device to update a socket;
   a first socket control block configured on said first communication device to close a socket;
   a second socket control block configured on said second communication device to apply socket information received from said first communication device;
   a session construction block configured on said second communication device to construct a session with a service providing block for using service; and
   a process control block configured on said second communication device to act on said session construction block to generate information associating a process with a socket.

2. A communication service handover system in which a communication service used by a user by a first communication device is continuously used by a second communication device, comprising:
   a socket update request block configured on said first communication device to request said second communication device to update a socket;
   a first socket control block configured on said first communication device to close a socket;
   a second socket control block configured on said second communication device to apply socket information received from said first communication device;
   a session construction block configured on said second communication device to construct a session with a service providing block for using service;
   a process control block configured on said second communication device to act on said session construction block to generate information associating a process with a socket;
   a file access log generation block configured on said first communication device to generate a file access log by a process; and
   a file update block configured on said second communication device to apply an access file received from said first communication device,
   wherein said process control block on said second communication device receives the access file specified by the file access log in said first communication device, and associates said received access file with a received process name.

3. The communication service handover system according to claim 2, further comprising:
   a move management server block configured on a server to manage move of a client;
   an HO process specification block configured on said first communication device to determine a process to be handed over due to specification by said user;
   another process control block configured on said first communication device to stop said process;
   a data transmission block configured on said first communication device to transmit necessary data to said second communication device;
   a first move management CL block configured on said first communication device to transmit a position registration message to said move management server block;
   another session construction block configured on said first communication device to construct a session with said service providing block for using service;
   a file generation block configured on said first communication device to generate a file handled by said process;
   a first communication block configured on said first communication device to communicate with outside of said first communication device;
   a second communication block configured on said second communication device to communicate with outside of said second communication device; and
   a second move management CL block configured on said second communication device to transmit a position registration message to said move management server block.

4. The communication service handover system according to claim 3, further comprising:
   a memory dump block configured on said first communication device to dump a memory used by said process at a certain timing; and
   a memory update block configured on said second communication device to apply the memory dump received from said first communication device.

5. The communication service handover system according to claim 3, further comprising:
   a process start request block configured on said first communication device to cause said second communication device to start said process;
   a log match determination block configured on said second communication device to determine whether the file access log received from said first communication device matches a log of sequence processes executed; and
   a file transmission request block configured on said second communication device to, in response to the log match, request said first communication device to transmit the file.

6. The communication service handover system according to claim 3, further comprising:
   a message dump block configured on said first communication device to dump a message received at the time of the session construction for each Destination Port Number;
   a message match determination block configured on said first communication device to capture a session constructing message sent to said second communication device and to determine whether it is the same as or similar to the message dump result at the time of the session construction;
   a process start request block configured on said first communication device to cause said second communication device to start said process;

a dummy socket generation block configured on said first communication device to capture an address for said second communication device from own socket pool to generate a dummy socket;

a transfer block configured on said first communication device to transfer packets that are exchanged between said second communication device and said service providing block;

a dummy socket application block configured on said second communication device to apply the dummy socket received from said first communication device; and a routing update block configured on said second communication device to switch routing between a first communication network interface and a second communication network interface.

7. A communication device that uses a communication service that can be continuously used by a user by a communication device belonging to another communication network in a communication service handover system, wherein said communication device and said communication device belonging to said another communication network are distinct from each other, wherein the communication device comprises:

a socket update request block configured to request a communication device belonging to another communication network to update a socket;

a first socket control block configured to close a socket;

a second socket control block configured to apply socket information received from a communication device belonging to another communication network;

a session construction block configured to construct a session with a service providing block for using service; and a process control block configured to act on said session construction block to generate information associating a process with a socket.

8. A communication device that uses a communication service that can be continuously used by a user by a communication device belonging to another communication network in a communication service handover system, comprising:

a socket update request block configured to request a communication device belonging to another communication network to update a socket;

a first socket control block configured to close a socket;

a second socket control block configured to apply socket information received from a communication device belonging to another communication network;

a session construction block configured to construct a session with a service providing block for using service;

a process control block configured to act on said session construction block to generate information associating a process with a socket;

a file access log generation block configured to generate a file access log by a process; and a file update block configured to apply an access file received from a communication device belonging to another communication network, wherein said process control block receives the access file specified by the file access log in a communication device belonging to another communication network, and associates said received access file with a received process name.

9. The communication device according to claim 8, further comprising:

an HO process specification block configured to determine a process to be handed over due to specification by said user;

another process control block configured to stop said process;

a data transmission block configured to transmit necessary data to a communication device belonging to another communication network;

a first move management CL block configured to transmit a position registration message to a move management server block configured on a server to manage move of a client;

another session construction block configured to construct a session with said service providing block for using service through said move management server block;

a file generation block configured to generate a file handled by said process;

a first communication block configured to communicate with a communication device belonging to another communication network and said service providing block; and a second move management CL block configured to transmit a position registration message to said move management server block, wherein said first move management CL block executes communication service handover to cause a communication device belonging to another communication network to continuously use a communication service being used, and wherein when a communication device belonging to another communication network executes communication service handover, said second move management CL block causes itself to continuously use a communication service having been used by a communication device belonging to another communication network.

10. The communication device according to claim 9, further comprising:

a memory dump block configured to dump a memory used by said process at a certain timing; and a memory update block configured to apply the memory dump received from a communication device belonging to another communication network.

11. The communication device according to claim 9, further comprising:

a process start request block configured to cause a communication device belonging to another communication network to start said process;

a log match determination block configured to determine whether the file access log received from a communication device belonging to another communication network matches a log of sequence processes executed; and a file transmission request block configured to, in response to the log match, request a communication device belonging to another communication network to transmit the file.

12. The communication device according to claim 9, further comprising:

a message dump block configured to dump a message received at the time of the session construction for each Destination Port Number;

a message match determination block configured to capture a session constructing message sent to a communication device belonging to another communication network and to determine whether it is the same as or similar to the message dump result at the time of the session construction;

a process start request block configured to cause a communication device belonging to another communication network to start said process;

a dummy socket generation block configured to capture an address for a communication device belonging to another communication network from own socket pool to generate a dummy socket;
a transfer block configured to transfer packets that are exchanged between a communication device belonging to another communication network and said service providing block;
a dummy socket application block configured to apply the dummy socket received from a communication device belonging to another communication network; and
a routing update block configured to switch routing between a first communication network interface and a second communication network interface.

13. A communication service handover method performed by a communication device that uses a communication service that can be continuously used by a user by a communication device belonging to another communication network in a communication service handover system,
wherein said communication device and said communication device belonging to said another communication network are distinct from each other,
wherein the communication service handover method comprises:
requesting a communication device belonging to said another communication network to update a socket;
closing a socket;
applying socket information received from a communication device belonging to said another communication network;
constructing a session with a service providing block for using service; and
generating information associating a process with a socket at the time of the session construction.

14. A communication service handover method performed by a communication device that uses a communication service that can be continuously used by a user by a communication device belonging to another communication network in a communication service handover system, comprising:
requesting a communication device belonging to said another communication network to update a socket;
closing a socket;
applying socket information received from a communication device belonging to said another communication network;
constructing a session with a service providing block for using service;
generating information associating a process with a socket at the time of the session construction;
generating a file access log by a process;
receiving the access file specified by the file access log in a communication device belonging to said another communication network;
associating said received access file with a received process name; and
applying said received access file.

15. The communication service handover method according to claim 14, further comprising:
determining a process to be handed over due to specification by said user;
stopping said process;
generating a file handled by said process;
transmitting necessary data to a communication device belonging to said another communication network;
transmitting a position registration message to a move management server block configured on a server to manage move of a client;
constructing a session with said service providing block for using service through said move management server block;
executing communication service handover to cause a communication device belonging to said another communication network to continuously use a communication service being used;
communicating with a communication device belonging to said another communication network and said service providing block;
transmitting a position registration message to said move management server block; and
continuously using a communication service having been used by a communication device belonging to said another communication network, when a communication device belonging to said another communication network executes communication service handover.

16. The communication service handover method according to claim 15, further comprising:
dumping a memory used by said process at a certain timing; and
applying the memory dump received from a communication device belonging to said another communication network.

17. The communication service handover method according to claim 15, further comprising:
causing a communication device belonging to said another communication network to start said process;
determining whether the file access log received from a communication device belonging to said another communication network matches a log of sequence processes executed; and
requesting a communication device belonging to said another communication network to transmit the file, in response to the log match.

18. The communication service handover method according to claim 15, further comprising:
dumping a message received at the time of the session construction for each Destination Port Number;
capturing a session constructing message sent to a communication device belonging to said another communication network to determine whether it is the same as or similar to the message dump result at the time of the session construction;
causing a communication device belonging to said another communication network to start said process;
capturing an address for a communication device belonging to said another communication network from own socket pool to generate a dummy socket;
transferring packets that are exchanged between a communication device belonging to said another communication network and said service providing block;
applying the dummy socket received from a communication device belonging to said another communication network; and
switching routing between a first communication network interface and a second communication network interface.

19. The communication service handover method according to claim 15,
wherein the communication device and a communication device belonging to said another communication network is an identical communication device that moves between a plurality of communication networks.

20. A non-transitory recording medium in which a program that causes the communication device to execute the communication service handover method according to claim 15 is stored.

* * * * *